US007736222B2

(12) United States Patent
Casey et al.

(10) Patent No.: US 7,736,222 B2
(45) Date of Patent: Jun. 15, 2010

(54) GAMING MACHINE HAVING A SHUFFLE FEATURE AND A SIMULTANEOUS MULTIPLE AWARD FEATURE

(75) Inventors: Michael P. Casey, Chicago, IL (US); Jason C. Gilmore, Elgin, IL (US)

(73) Assignee: WMS Gaming Inc., Waukegan, IL (US)

(*) Notice: Subject to any disclaimer, the term of this patent is extended or adjusted under 35 U.S.C. 154(b) by 1600 days.

(21) Appl. No.: 10/757,151

(22) Filed: Jan. 14, 2004

(65) Prior Publication Data

US 2005/0153769 A1 Jul. 14, 2005

(51) Int. Cl.
*A63F 13/00* (2006.01)

(52) U.S. Cl. ............................ 463/16; 463/11; 463/17; 273/138.1; 273/292

(58) Field of Classification Search .................. 463/11, 463/16–20; 273/138.1, 143 R, 292
See application file for complete search history.

(56) References Cited

U.S. PATENT DOCUMENTS 6,015,346 A 1/2000 Bennett ....................... 463/20
6,089,976 A 7/2000 Schneider et al. ............. 463/16
6,190,255 B1 2/2001 Thomas et al. ................ 463/20
6,311,976 B1 * 11/2001 Yoseloff et al. .......... 273/138.2
6,346,043 B1 * 2/2002 Colin et al. ................... 463/17
6,347,996 B1 2/2002 Gilmore et al. ............... 463/17
6,517,433 B2 * 2/2003 Loose et al. .................. 463/20
6,589,114 B2 7/2003 Rose ........................... 463/20

* cited by examiner

*Primary Examiner*—Dmitry Suhol
*Assistant Examiner*—Andrew Kim
(74) *Attorney, Agent, or Firm*—Nixon Peabody LLP

(57) ABSTRACT

The present invention is a gaming machine having a shuffle feature and a simultaneous multiple award feature. The method for conducting the shuffle feature includes displaying a plurality of value-based symbols in a random array where each of the plurality of value-based symbols displays a number indicating a value, increasing the displayed number of one of the plurality of value-based symbols in response to a player selection, rearranging the plurality of value-based symbols in view of the random array such that the rearranged plurality defines an award and awarding the award to the player. The method for conducting the simultaneous multiple award feature includes displaying an assemblage of selectable tiles that conceal an associated plurality of icons, receiving successive player selections of the tiles, selectively revealing a first group and a second group of related game-theme icons, selectively revealing a wild icon and simultaneously awarding a first and a second award.

21 Claims, 19 Drawing Sheets

500

501

501

601

GAMING MACHINE HAVING A SHUFFLE FEATURE AND A SIMULTANEOUS MULTIPLE AWARD FEATURE

FIELD OF THE INVENTION

This invention is directed to gaming machines, and more particularly, to a gaming machine having a shuffle feature and a simultaneous multiple award feature.

BACKGROUND

Gaming machines providing base games of chance such as electronically driven video slots, video poker, video blackjack, video keno, video bingo, video pachinko, video lottery, and mechanically driven reel slots, etc., are well known in the gaming industry. Generally gaming machines are configured to operate as "stand-alone" units (that may or may not be coupled to a backroom computer) where the outcome of game play is "locally determined", or as part of a server-based gaming network where the outcome of game play may be either locally determined or "centrally determined".

Video gaming machines are configured with a main video display for displaying video game images including video images representing game play information such as game outcome (e.g., simulated reel symbol array in the case of a slot game, simulated cards, simulated numbers, etc.). In addition to displaying game play information, the main video display may be configured with a touch screen to allow player interaction. The player can make a number of game play selections by touching "virtual" buttons or particular touch-sensitive areas provided on the main video display. Alternatively, the player can make game play selections by depressing various electro-mechanical buttons provided on a player control panel.

Mechanical spinning reel slot machines, on the other hand, generally include a main reel display area configured to allow a player to view a reel symbol array provided by stopped mechanical spinning reels. Player selections are typically made by depressing various electro-mechanical buttons provided on a player control panel of the mechanical spinning reel slot machine.

Recently, secondary or "bonus" games have been used in conjunction with "base" wagering games to enhance overall game play. A bonus game may include any type of game, either similar to or different from the base wagering game. Bonus game play is usually triggered by an "event" during base game play. The event may be the occurrence of a symbol or symbols. The event may also be randomly generated or may be triggered by the number of credits spent, time of day, etc. Once triggered, bonus game play may require the player to perform one of any number of fun bonus activities resulting in "extra" awarded credits or "free spins" that may or may not result in awarded credits, and so on. As a result, gaming manufacturers are increasingly offering gaming machines having new and exciting bonus games.

SUMMARY OF THE INVENTION

In general, the present invention provides a gaming machine having a shuffle feature and a simultaneous multiple award feature. The method for conducting the shuffle feature includes displaying a plurality of value-based symbols in a random array where each of the plurality of value-based symbols displays a number indicating a value, increasing the displayed number of one of the plurality of value-based symbols in response to a player selection, rearranging the plurality of value-based symbols in view of the random array such that the rearranged plurality defines an award and awarding the award to the player.

The method for conducting the simultaneous multiple award feature includes displaying an assemblage of selectable tiles that conceal an associated plurality of icons, receiving successive player selections of the tiles, selectively revealing a first group and a second group of related game-theme icons, selectively revealing a wild icon and simultaneously awarding a first and a second award where the first award is associated with a first match including the first group and the wild icon, and the second award is associated with a second match including the second group and the wild icon.

Additional aspects of the invention will be apparent to those of ordinary skill in the art in view of the detailed description of various embodiments, which is made with reference to the drawings, a brief description of which is provided below.

DESCRIPTION OF THE PREFERRED EXAMPLES

The description of the preferred examples is to be construed as exemplary only and does not describe every possible embodiment of the invention. Numerous alternative embodiments could be implemented, using either current technology or technology developed after the filing date of this patent, which would still fall within the scope of the claims defining the invention.

In general, the present invention provides a gaming machine having a shuffle feature and a simultaneous multiple award feature, and a method for conducting the shuffle feature and the simultaneous multiple award feature. As described below, the present invention is preferably implemented using a video slot machine.

It is contemplated that the present invention may also be implemented using other types of video gaming machines or, in some cases, using an adaptable mechanical spinning reel gaming machine having flat panel transmissive display positioned in front of the mechanical spinning reels where the flat panel transmissive display is able to superimpose video images upon the mechanical spinning reels. A mechanical spinning reel gaming machine with superimposed video images generated via a variable display device such as a flat panel transmissive display is described in U.S. Pat. No. 6,517,433, entitled "Reel Spinning Slot Machine With Superimposed Video Image", naming Loose et al. as inventors, filed May 22, 2001 ("the Loose et al. patent"), and herein incorporated by reference in its entirety.

An advantageous feature of the gaming machine having the shuffle feature described herein is that, unlike gaming machines having prior art shuffle features, a player selection of one of a number of value-based symbols causes a value associated with the player-selected value-based symbol to be increased prior to rearranging, or shuffling, the value-based symbols to define an award. In this way, the player, via selection of one of the value-based symbols, may positively affect the amount of the award.

An advantageous feature of the gaming machine having the simultaneous multiple award feature described herein is that, unlike prior art bonus games allowing player selections of elements from an assemblage until a stop-selection outcome, or "pooper" is selected or until a single award is made to the player, the assemblage of the simultaneous multiple award feature does not include a pooper and the player has an opportunity to win simultaneous multiple awards.

Figure 1:
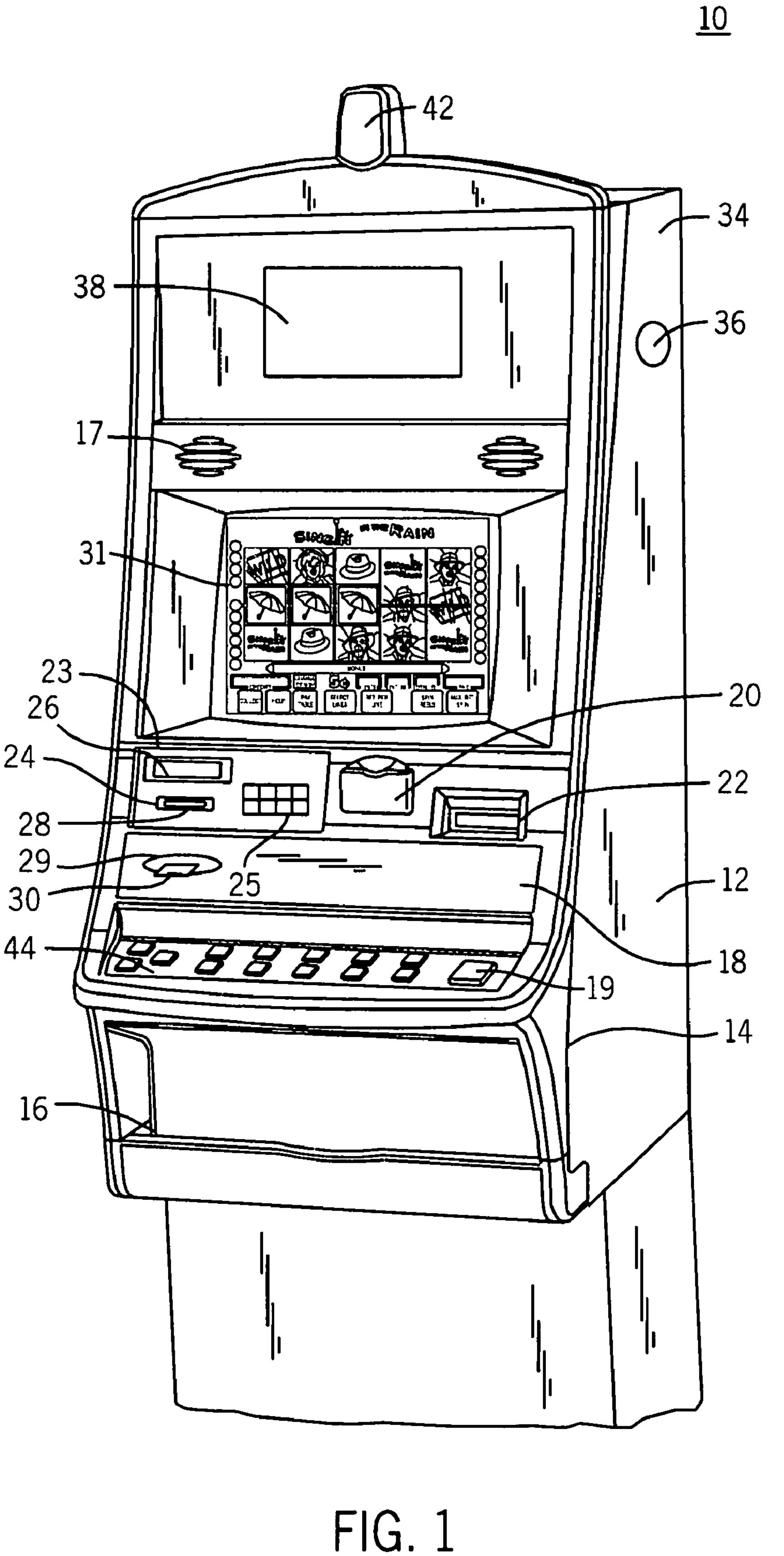
FIG. 1 is a perspective view of an embodiment of a gaming machine having a shuffle feature and a simultaneous multiple award feature.

FIG. 1 is a perspective view of one possible embodiment of a gaming machine 10 offering a shuffle feature and/or a simultaneous multiple award feature. The gaming machine 10 may be configured as a stand-alone gaming machine or may be configured as part of a server-based gaming network having one or more coupled servers and a number of additional gaming machines. The gaming machine 10 may be any type of wagering gaming machine having a shuffle feature with a player affected outcome and/or having a simultaneous multiple award feature and may therefore have varying structures and methods of operation. For example, the gaming machine 10 may be a video gaming machine configured to play a video wagering game, or it may be a mechanical spinning reel slot machine (with or without an arm mechanism). For exemplary purposes, various elements of the gaming machine 10 are described below, but it should be understood that numerous other elements may exist and may be utilized in any number of combinations to create a variety of gaming machine types.

Referring to FIG. 1, the gaming machine 10 includes a cabinet 12 having a door 14 to provide access to the interior of the gaming machine 10. Attached to the door 14 are audio speaker grills 17 and a belly glass area 18 that typically displays game theme artwork. Sounds provided via the audio speaker grills 17 and associated audio speakers may include the sound of spinning slot machine reels, a dealer's voice, music, announcements or any other audio related to the wagering game.

Also attached to the door 14 are a number of value input devices that allow a player to insert value for game play. The value input devices may include a coin slot acceptor 20 or a note acceptor 22 to input value to the gaming machine 10. As used herein, the term "value" may encompass gaming tokens, coins, paper currency, ticket vouchers, credit or debit cards, smart cards, and any other object representative of value.

The gaming machine 10 may also include a player tracking area 23 having a card reader 24, a keypad 25 and a small display 26. As will be appreciated by those of ordinary skill in the art, the player tracking area 23 may be located in any number of areas of the gaming machine 10. The gaming machine 10 may also include a box top 34 having additional speaker(s) 36 and a top box display device 38, and a camera and/or a microphone for group or tournament game play.

The gaming machine 10 also includes a main display device 31 for displaying video game images (e.g., simulated reel symbols, simulated cards, simulated numbers, etc.), or in the case of a mechanical spinning reel slot machine, for displaying a symbol array of artwork and blank symbols affixed to mechanical spinning reels viewable to the player. The symbol array may include occurrences of non-winning symbol combinations where no value payout is awarded to the player, or occurrences of winning symbol combinations (reflected in a pay table) where value payouts are awarded to the player. In addition, the main display device 31 may display animation, 2-D or 3-D images and digital video playback.

For video gaming machines, the main display device 31 may be implemented as a CRT, an LCD, a VFD, a plasma display, an organic liquid crystal display or other type of video display suitable for use in a gaming machine, and includes a touch screen. For example, in a video gaming machine offering a slot game, the main display device 31 may include an LCD-TFT display displaying video reel artwork symbols and blank symbols.

For mechanical spinning reel slot machines, the main display device 31 includes a reel display area and may additionally include a touch screen. Alternatively, the touch screen may be provided at a location disposed part from the main display device 31. The reel display area is adapted to display game information to a player while, at the same time, allowing the player to view a reel symbol array provided by the stopped mechanical spinning reels. The game information displayed to the player may include game denominations, available credits, pay lines, wagering information, and other suitable game information. When the mechanical spinning reels are rotated and stopped, the resulting symbol array in conjunction with game information displayed in the reel display area provide a game outcome and game status to the player.

The gaming machine 10 may also include a player control panel 44. The player control panel 44 may be provided with a number of pushbuttons or touch-sensitive areas (i.e., touch screen) that may be pressed by a player to select games, make wagers, make gaming decisions, etc. As used herein, the term "button" is intended to encompass any device that allows a player to make an input, such as a mechanical input device that must be depressed to make an input selection or a display area that a player may simply touch. Further, although the player control panel 44 is shown to be separate from the main display device 31, it should be understood that the control panel 44 could be generated as a touch-sensitive screen by the main display device 31.

Referring again to FIG. 1, when a player inserts value in the gaming machine 10, credits corresponding to the amount deposited are displayed on a credit meter of the gaming machine 10. After depositing the appropriate amount of value and making appropriate selections, the player begins base game play by pulling a mechanical arm or by pushing an appropriate button such as a Bet button, a Max Bet button, or a Play button on the player control panel 44. Subsequent game play outcome displayed via the main display device 31 may be determined either centrally or locally (1) using a random number generator (RNG) resulting in a pseudo random set of outcomes, or (2) by selecting a game outcome from a fixed set of outcomes (pooled), or (3) other suitable technique. In addition, when triggered by a bonus triggering event such as an occurrence of selected symbols, a bonus game may be made available to the player. Like base game play, an outcome associated with bonus game play may be determined using an RNG, a fixed set of outcomes, or other suitable technique. Additional details describing enhanced game play on the gaming machine 10 having a shuffle feature and a simultaneous multiple award feature are included below as described in connection with FIGS. 3-19.

Figure 2:
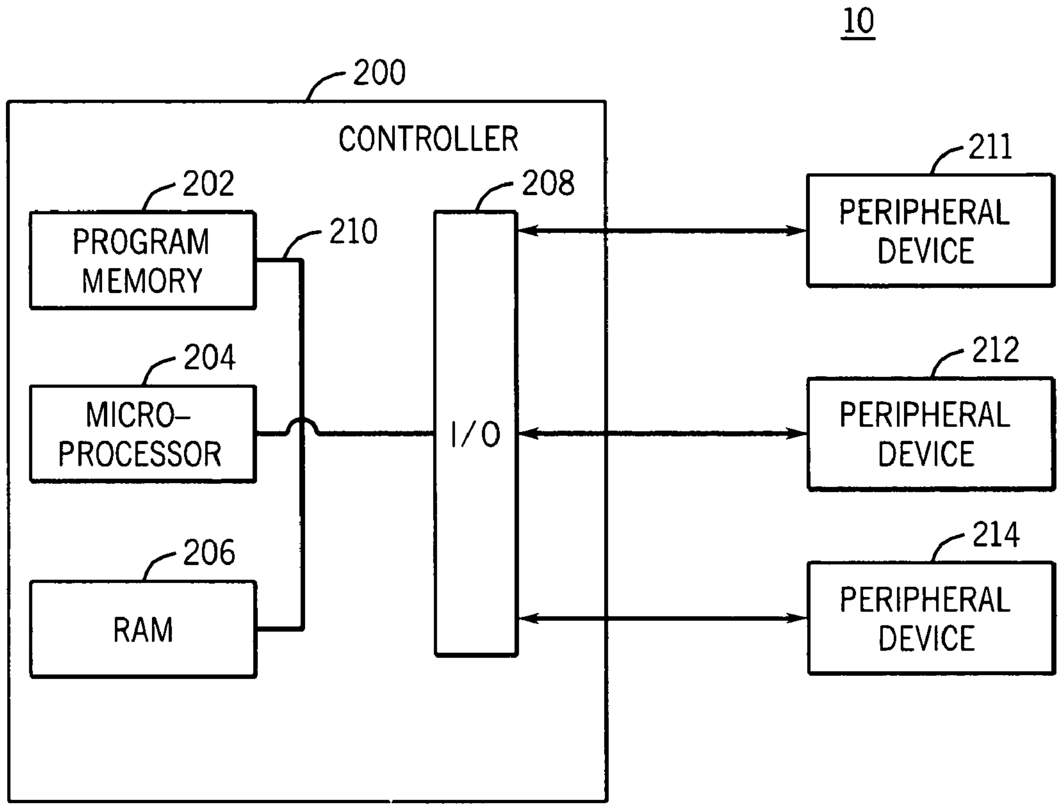
FIG. 2 is a block diagram of the electronic components of the gaming machine of FIG. 1.

FIG. 2 is a block diagram of a number of components that may be incorporated in the gaming machine 10 of FIG. 1.

Referring to FIG. 2, the gaming machine 10, includes a controller 200 that may comprise a program memory 202 (including a read only memory (ROM)), a microcontroller-based platform or microprocessor (MP) 204, a random-access memory (RAM) 206 and an input/output (I/O) circuit 208, all of which may be interconnected via a communications link, or an address/data bus 210. The microprocessor 204 is capable of displaying images, symbols and other indicia such as characters, people, places, things, and faces of cards. The RAM 206 is capable of storing event data or other data used or generated during a particular game. The program memory 202 is capable of storing program code that controls the gaming machine 10 so that it plays a particular game in accordance with applicable math models, game rules, and pay tables. For example, when the bonus scheme with simultaneous multiple awards is triggered during base game play, the microprocessor 204, executing code in the program memory 202, causes a "game board", or assemblage of tiles, and an associated "legend" to be displayed, and then enables game subsequent bonus game play.

It should be appreciated that although only one microprocessor 204 is shown, the controller 200 may include multiple microprocessors 204. For example, the controller 200 may include one microprocessor for executing low level gaming functions and another processor for executing higher-level game functions such as some communications, security, maintenance, etc. Similarly, the memory of the controller 200 may include multiple RAMs 206 and multiple program memories 202, depending on the requirements of the gaming machine 10. Although the I/O circuit 208 is shown as a single block, it should be appreciated that the I/O circuit 208 may include a number of different types of I/O circuits. The RAM(s) 206 and program memory(s) 202 may be implemented as semiconductor memories, magnetically readable memories, and/or optically readable memories, etc. Further, the term "controller" is used herein to refer collectively to the program memory 202, the microprocessor 204, the RAM 206 and the I/O circuit 208.

FIG. 2 illustrates that multiple peripheral devices, depicted as peripheral devices 211, 212, and 214, may be operatively coupled to the I/O circuit 208. The peripheral devices may include a control panel with buttons, a coin slot acceptor, a note acceptor, a bill validator, a card reader, a keypad, a sound circuit driving speakers, a card reader display, a video display, a touch screen, etc. In the case of a spinning reel slot machine, the peripheral devices may include a number of electro-mechanical spinning reels and a mechanical arm similarly coupled to the I/O circuit 208. Although three peripheral devices are depicted, more or less peripheral devices may be included.

It should be appreciated that although the controller 200 is a preferable implementation of the present invention, the present invention also includes implementation via one or more application specific integrated circuits (ASICs), field programmable gate arrays (FPGA), adaptable computing integrated circuits, one or more hardwired devices, or one or more mechanical devices.

One manner in which the gaming machine 10 may operate is described below in connection with one or more flowchart(s) that represents a number of portions or routines of one or more computer programs, which may be stored in one or more of the memories of the controller 200. The computer program(s) or portions thereof may also be stored remotely, outside of the gaming machine 10 and may therefore control the operation from a remote location.

As previously mentioned, a bonus triggering event occurs during base wagering game play allowing the player to participate in bonus game play. Although preferably triggered by a predetermined arrangement of pre-selected reel symbol(s), the bonus game may, for example, be provided to a player as a result of operation of the RNG or may be provided to the player based on predetermined criterion such as a time of day, a day of a week, a promotional activity, a local activity, the player's identity, a selection made by player, a selection made by a casino operator, a dollar amount won or played, etc. In addition, although described in terms of bonus game play triggered during slot game play, the shuffle feature and the simultaneous multiple award feature described below may be included in any type of game of chance or skill or combination of games.

I. Shuffle Feature

Figure 3:
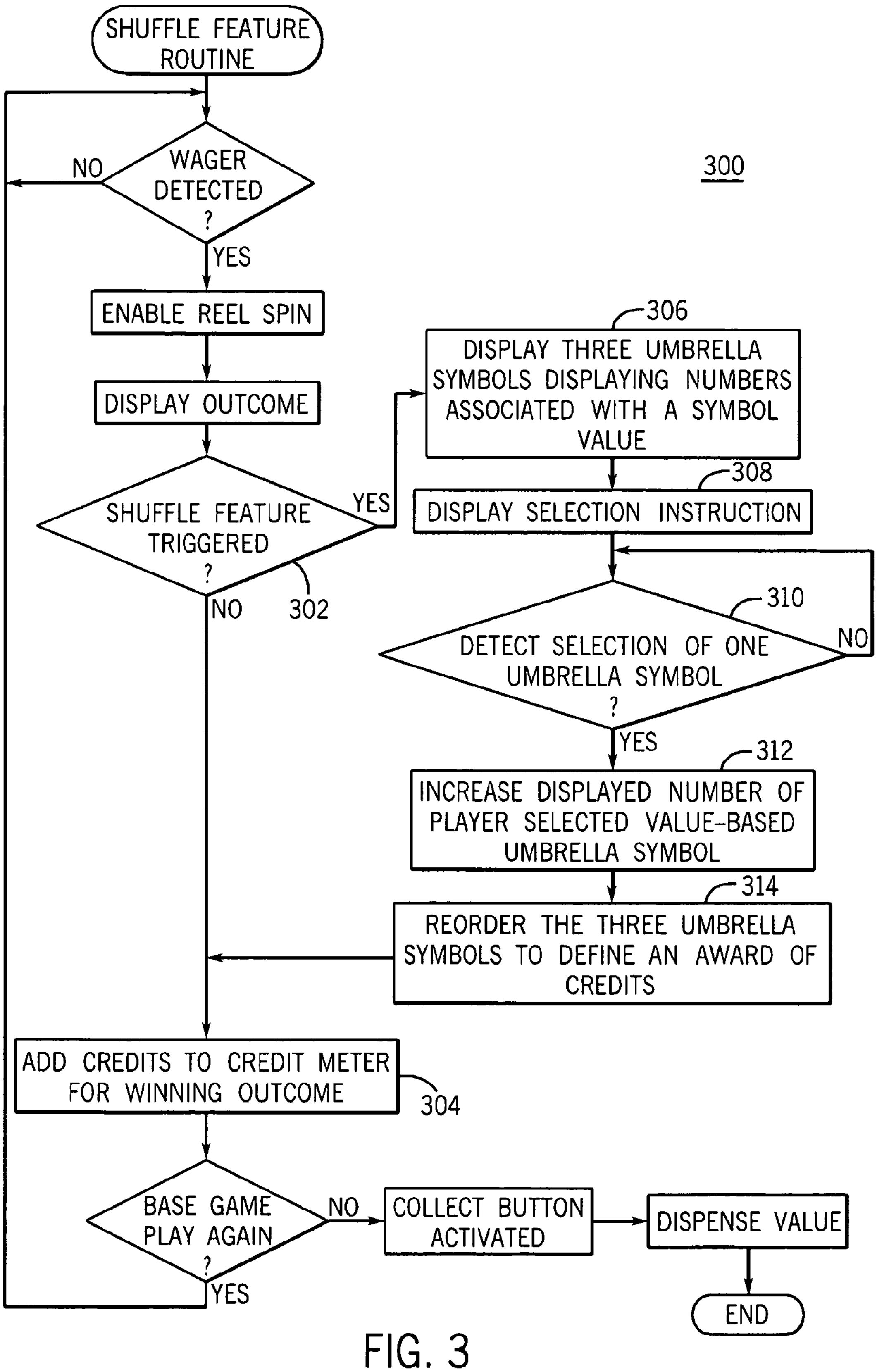
FIG. 3 is a flowchart of en embodiment of the shuffle feature routine that may be performed during game play of the gaming machine of FIG. 1.

FIG. 3 is a flowchart of a shuffle feature routine 300 that may be performed by the controller 200 of the gaming machine 10. Alternatively, the shuffle feature routine 300 may be performed by another controller coupled to the gaming machine 10. The shuffle feature routine 300 provides one example of a bonus game allowing player selection of one of a number of value-based symbols where player selection causes the value associated with the selected symbol to increase prior to rearranging the symbols to define an award. Although discussed below in the context of a slot game for illustrative purposes, it is contemplated the shuffle feature routine 300 may be executed in conjunction with any number of other wagering base or bonus games provided by gaming machines.

Referring to FIG. 3, the shuffle feature routine 300 begins operation when, after detecting a value input, detecting a bet and providing a game outcome, the controller 200 detects an occurrence of a shuffle feature triggering event (step 302). The controller 200 detects the value input when a player deposits one or more of coins, paper currency, a card, or a voucher into a value input device of the gaming machine 10. When the controller 200 detects the value input, a number of credits corresponding to the amount deposited are displayed on a credit meter of the main display device 31. After value input detection, the controller 200 enables a pay line selection. If there is only one pay line, the controller 200 enables initiation of base game play. If there is more than one pay line, the controller 200 also enables a bet-per-pay line selection. The bet-per-pay line selection causes an amount per pay line to be bet or wagered with the total wager divided equally between each selected pay line if multiple pay lines are selected. The bet-per-pay line is also displayed to the player via the bet meter. In addition, the controller 200 enables the player to select a maximum bet (via a "Max Bet Spin" button). Thus, the player may choose the maximum bet option causing maximum pay line selection and maximum credits rather than the pay line selection and the bet per pay line selection. In either case, the controller 200, having determined a game outcome based on operation of a random generator device, stops the reels such that they display a symbol array representing the game outcome. If reel symbols on the stopped reels match one of the winning symbol combinations displayed on a pay table, the controller 200 displays a value payout associated with the winning symbol combination and awards the player accordingly (step 304).

Additionally, when the game outcome includes an occurrence of a shuffle feature triggering event, the controller 200 shifts from wagering base game play operation to the shuffle feature routine 300. The shuffle feature triggering event may be defined in any number of ways as described above. For example, the shuffle feature routine 300 discussed in connection with FIGS. 5-8 is provided to the player in response to an occurrence of a pre-selected reel symbol combination.

Figure 5:
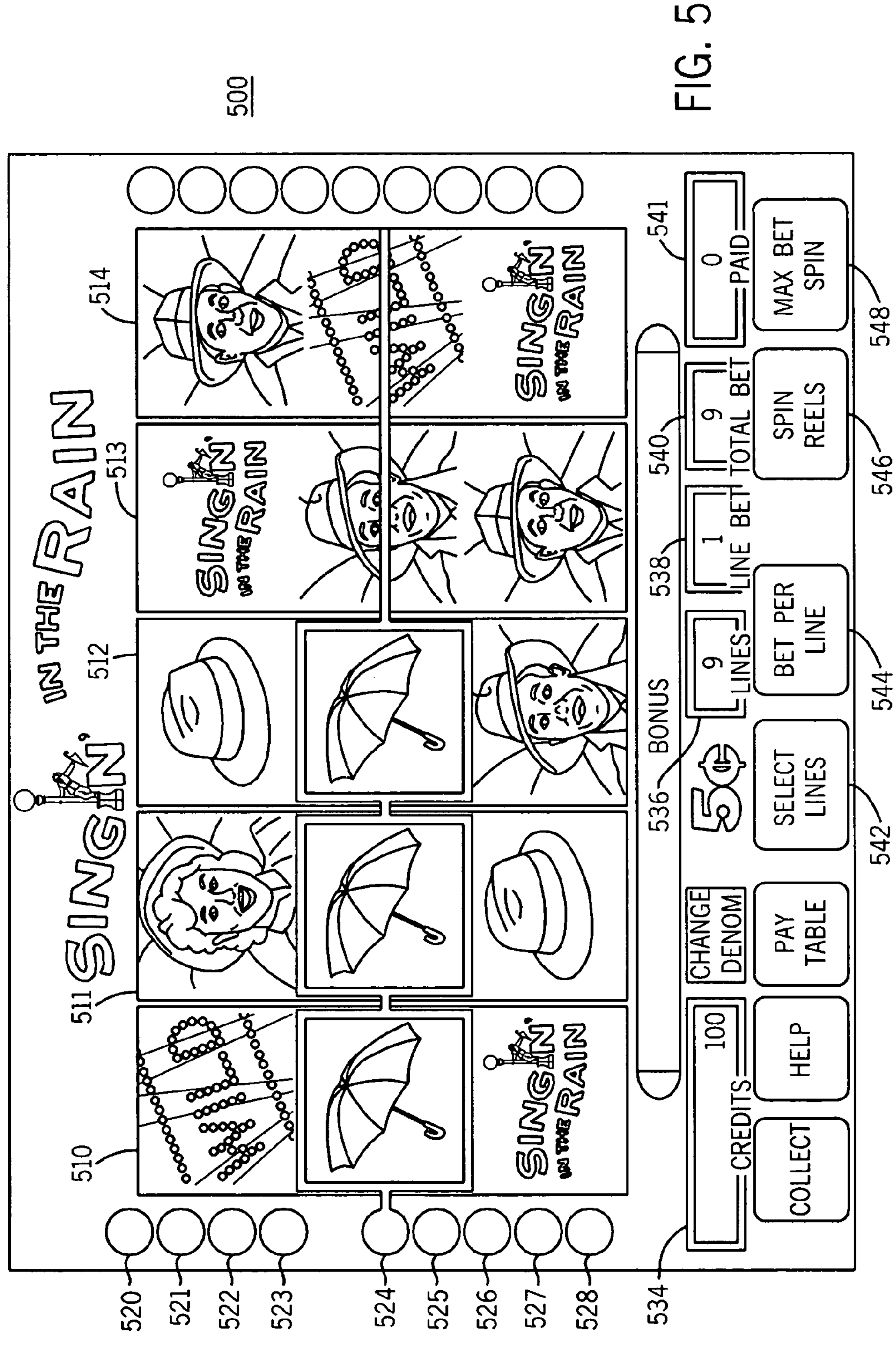
FIGS. 5-8 are a series of exemplary display screens that may be displayed during performance of the shuffle feature routine of FIG. 3.

For example, FIG. 5 is an embodiment of an exemplary display screen 500 of a game outcome including an occurrence of a shuffle feature triggering event that may be displayed on the main display device 31. The exemplary display screen 500 includes five video simulated reels 510-514 with nine pay lines 520-528. As will be appreciated by those of ordinary skill in the art, different numbers of video simulated reels and/or pay lines may be included. Each of the pay lines 520-528 extends through one symbol on each of the five reels 510-514. In the illustrated example, an occurrence of three adjacent umbrella symbols displayed on reels 510-512 triggers the shuffle feature routine 300.

The exemplary display screen 500 also includes a credit meter 534 for displaying a number of credits available for base game play (e.g., 100 credits), a pay line indicator 536 for displaying the number of pay lines selected (e.g., 9 pay lines), a bet indicator 538 for displaying the number of credits wagered per pay line for a current game (e.g., 1 credit), a total bet indicator 540 for displaying the total credits wagered (e.g., 9 credits), and a paid indicator 541 for displaying credits won, if applicable, for the wager. Also shown are a number of player selectable buttons such as a select lines button 542, a bet per line button 544, a spin reels button 546, a max bet spin button 548, etc.

Referring again to FIG. 3, upon the occurrence of a bonus triggering event (step 302), the controller 200 enables play of the shuffle feature routine 300 (step 306); in the illustrated example, displays three value-based symbols with each of the symbols displaying a number indicating an associated value of the value-based symbol. The value-based symbols are displayed in a random array. The controller 200 also causes an instruction to be displayed (step 308). The instruction prompts the player to select one of the three value-based symbols to increase its value. Although the player is preferably directed to make one selection per bonus game, it is contemplated that the player may be directed to make more than one selection yielding multiple value increases of one value-based symbol or yielding value increases for more than one value-based symbol.

Upon detection of player selection of one of the value-based symbols (step 310), the controller 200 "randomly" increases the value of the player selected value-based symbol (step 312). This increase is reflected as an increase in the displayed number indicating an increase in the associated value of the player selected value-based symbol. Next, the controller 200 causes the value-based symbols to be rearranged, in view of their original random array, to define an award of credits (step 314). The credit award is then awarded to the player (step 304).

In another embodiment, upon detection of player selection of one of the value-based symbols (step 310), the controller 200 increases the value of the player selected value-based symbol by a predetermined number known to the player. For example, upon detection of a player selection of one of the value-based symbols, the controller 200 increases the value of the player selected value-based symbol by one.

Figure 6:
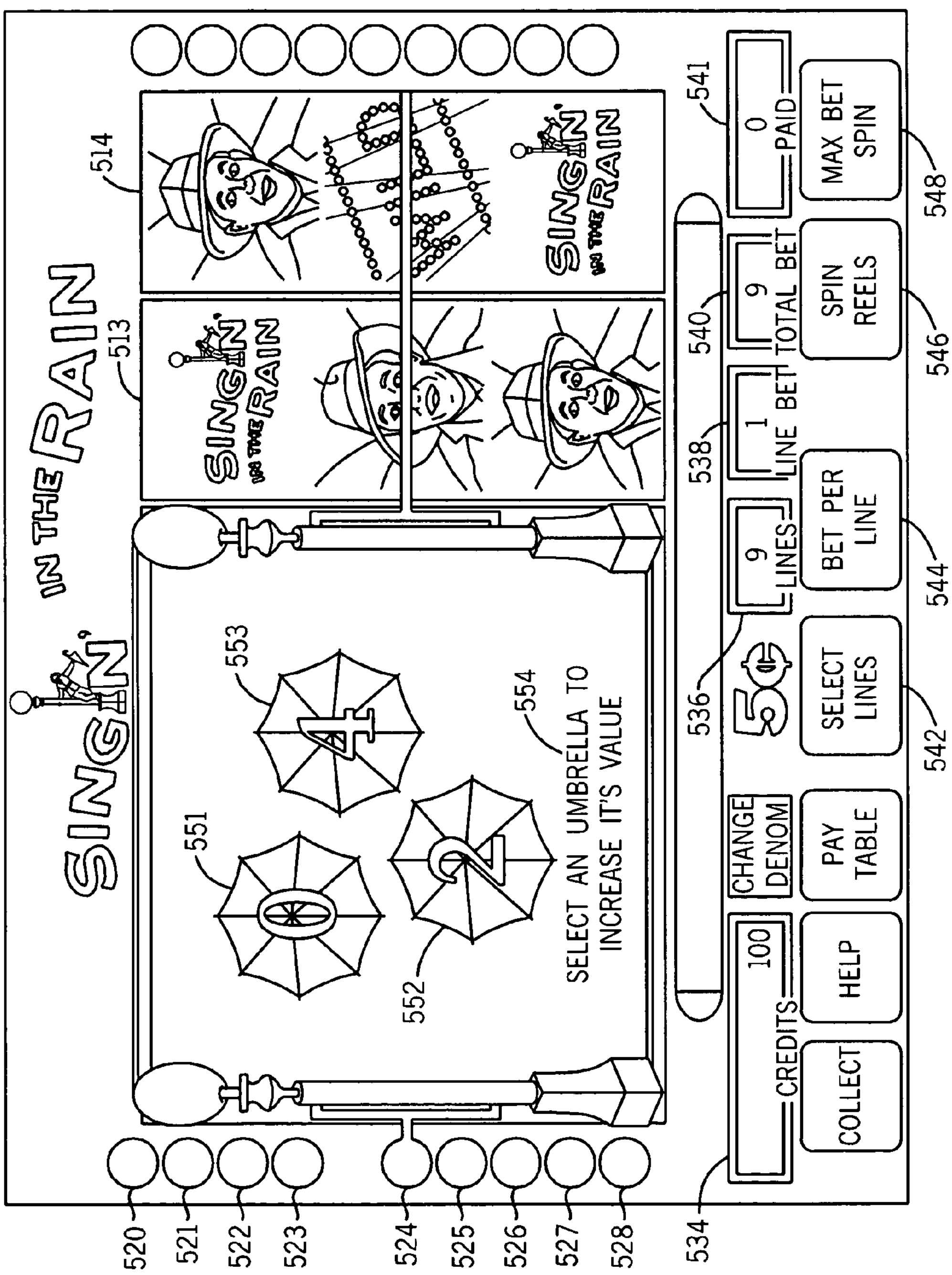

For example, FIG. 6 an exemplary display screen 501 that may be displayed after an occurrence of the shuffle feature triggering event of FIG. 5. In the illustrated example, the area occupied by reels 510-512 have been replaced by a theme display that includes the three value-based symbols; in this case, includes three umbrella tops 551, 552, 553, randomly arranged, displaying numbers zero, two, and four reflecting their value respectively. Also displayed is an instruction 554 prompting the player to select one of the three umbrella tops to increase its associated value.

Figure 7:
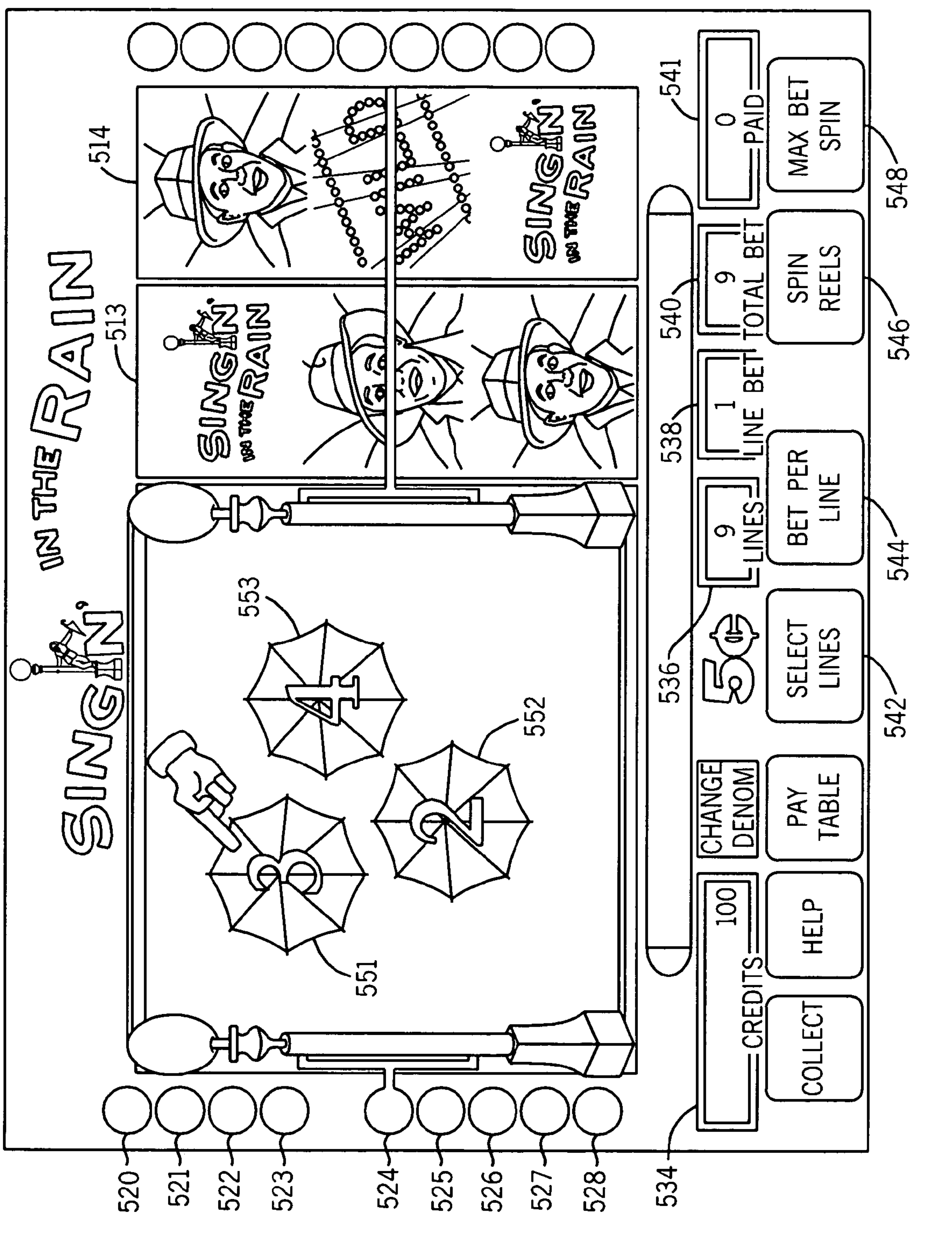

Referring to FIG. 7, upon detection of player selection of umbrella top 551, the controller 200 randomly increases the displayed number of the selected umbrella top 551 by two from zero to three. This increase in the displayed number indicates an increase in the associated value of the player selected umbrella top 551. The controller 200 then causes the umbrella tops 551-553 to twirl and rearrange into a linear pattern defining an award.

The umbrella tops 551-553 can be rearranged into one of six possible awards. For example, the umbrella tops 551-553 can be rearranged into 234 credits, 243 credits, 324 credits, 342 credits, 423 credits and 432 credits. When executing the rearrangement, or the shuffle, the controller 200 randomly selects one of the six awards based on a probability table that is weighted in favor of the smaller awards such as 234 credit award and 243 credit award.

Figure 8:
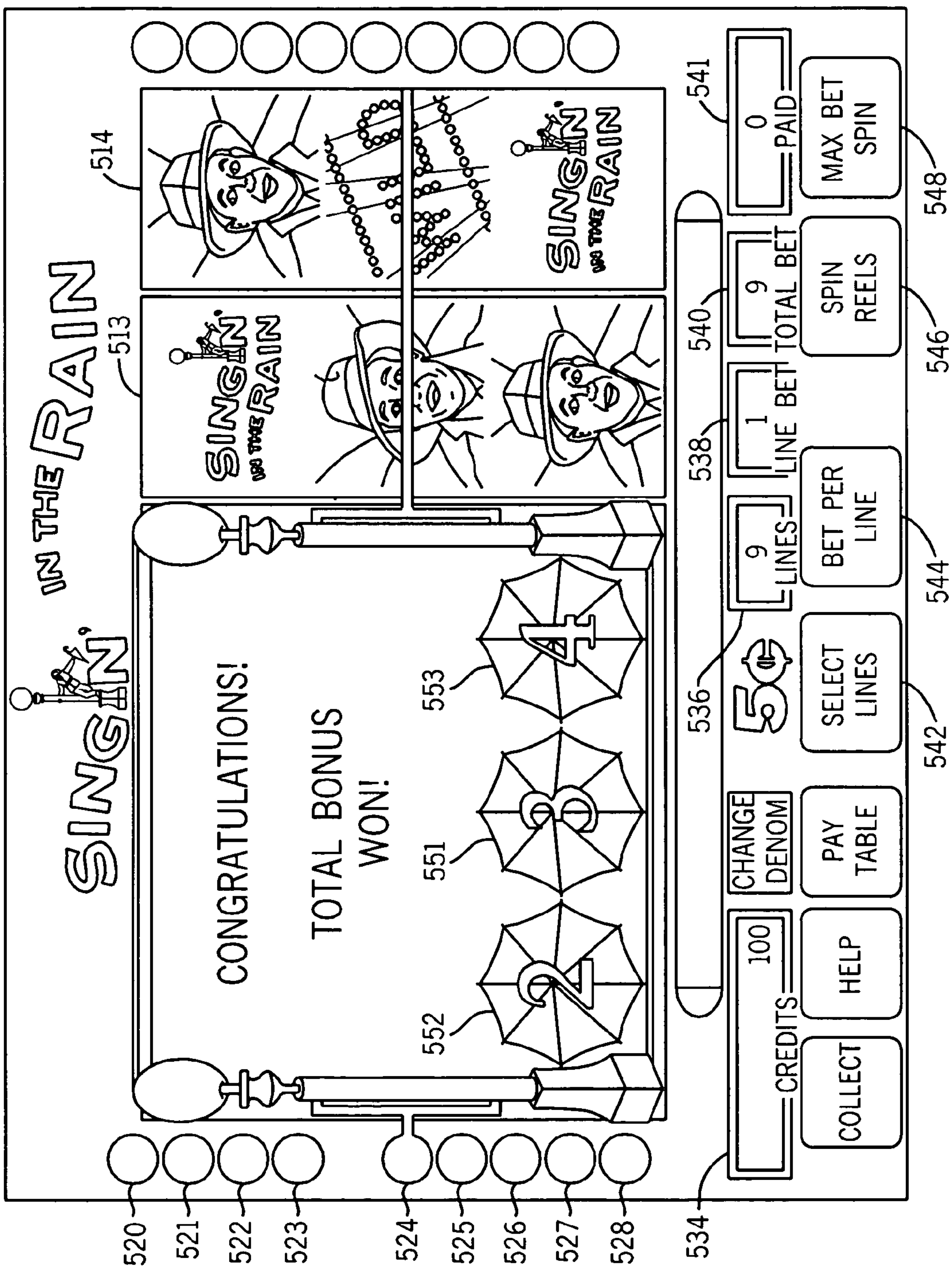

FIG. 8 illustrates the rearranged umbrella tops 551-553, in view of the random array reflected in FIG. 6, in a linear pattern (defined by umbrella tops 552, 551, and 553, respectively), to yield an award of 234 credits to the player. The award of 234 credits is reflected on the paid indicator 541. Therefore, unlike other prior art shuffle bonus games where the value associated with the value-based symbols is fixed, the shuffle feature routine 300 allows the player to select, prior to rearranging, one of the value-based symbols to increase its value. As a result, the player can strategically select one of the value-based symbols for a value increase to possibly maximize the award yielded by the rearranged value-based symbols.

II. Simultaneous Multiple Award Feature

Figure 4:
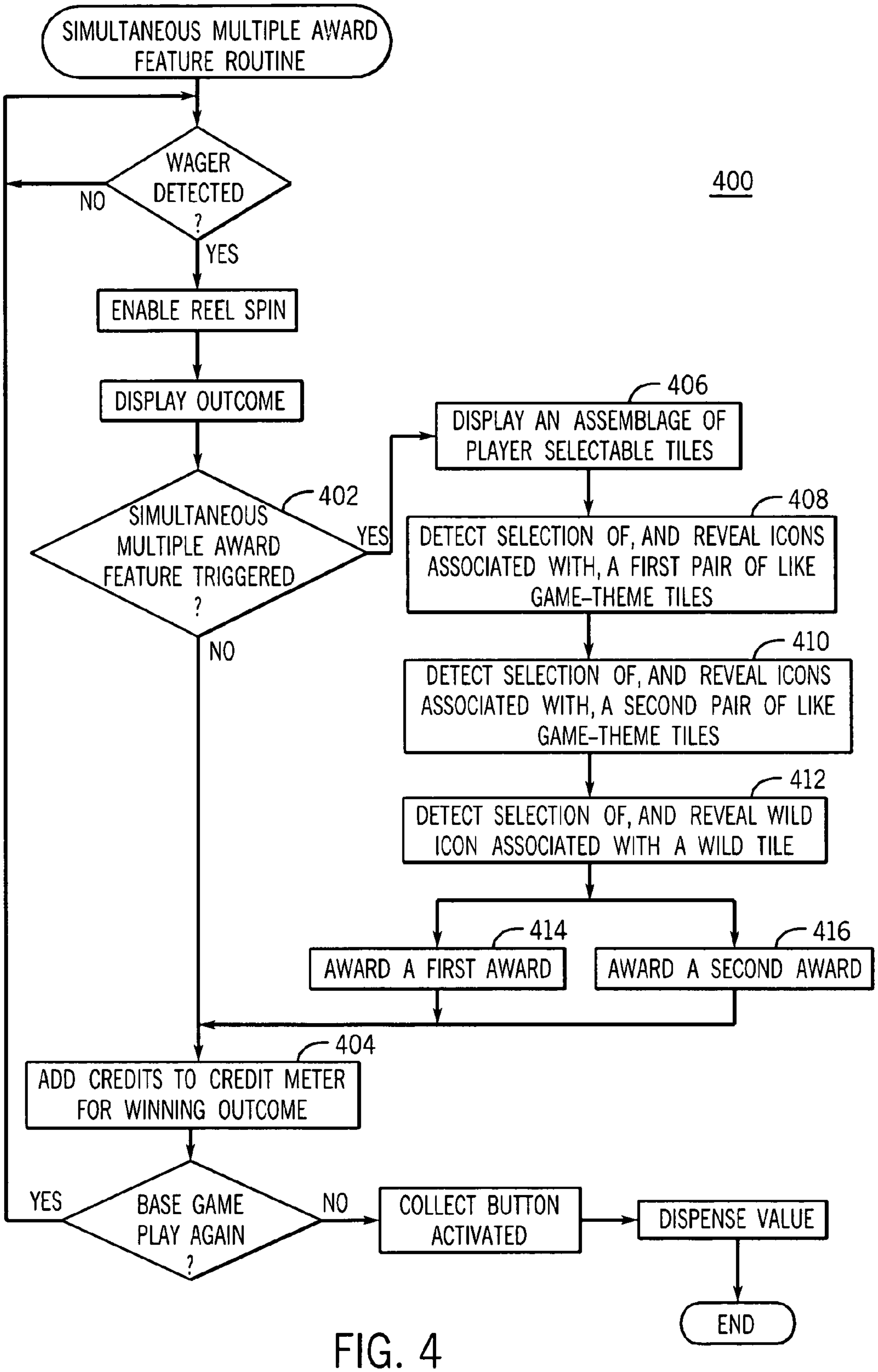
FIG. 4 is a flowchart of an embodiment of the simultaneous multiple award feature routine that may be performed during game play of the gaming machine of FIG. 1.

FIG. 4 is a flowchart of an embodiment of a simultaneous multiple award feature routine 400 that may be performed during operation of the gaming machine 10. The simultaneous multiple award feature routine 400 is one example of a bonus game where an assemblage of player selectable tiles, or elements, does not include a pooper, and where the player has an opportunity to win simultaneous multiple awards after successive tile selections of two or more matching groups of related game-theme icons and a wild icon associated the respective tile selections.

Referring to FIG. 4, the simultaneous multiple award feature routine 400 begins operation when, after detecting a value input, detecting a bet and providing a game outcome, the controller 200 detects an occurrence of a simultaneous multiple award feature triggering event (step 402). Upon detecting the simultaneous multiple award feature triggering event, the controller 200 shifts from wagering base game play operation to the simultaneous multiple award feature routine 400. The simultaneous multiple award feature triggering event may be defined in any number of ways. For example, a simultaneous multiple award feature triggering event may occur when a special reel symbol or a special combination of reels symbols appear in the game outcome. As will be appreciated by those skilled in the art, other simultaneous multiple award feature triggering events may be contemplated.

Figure 9:
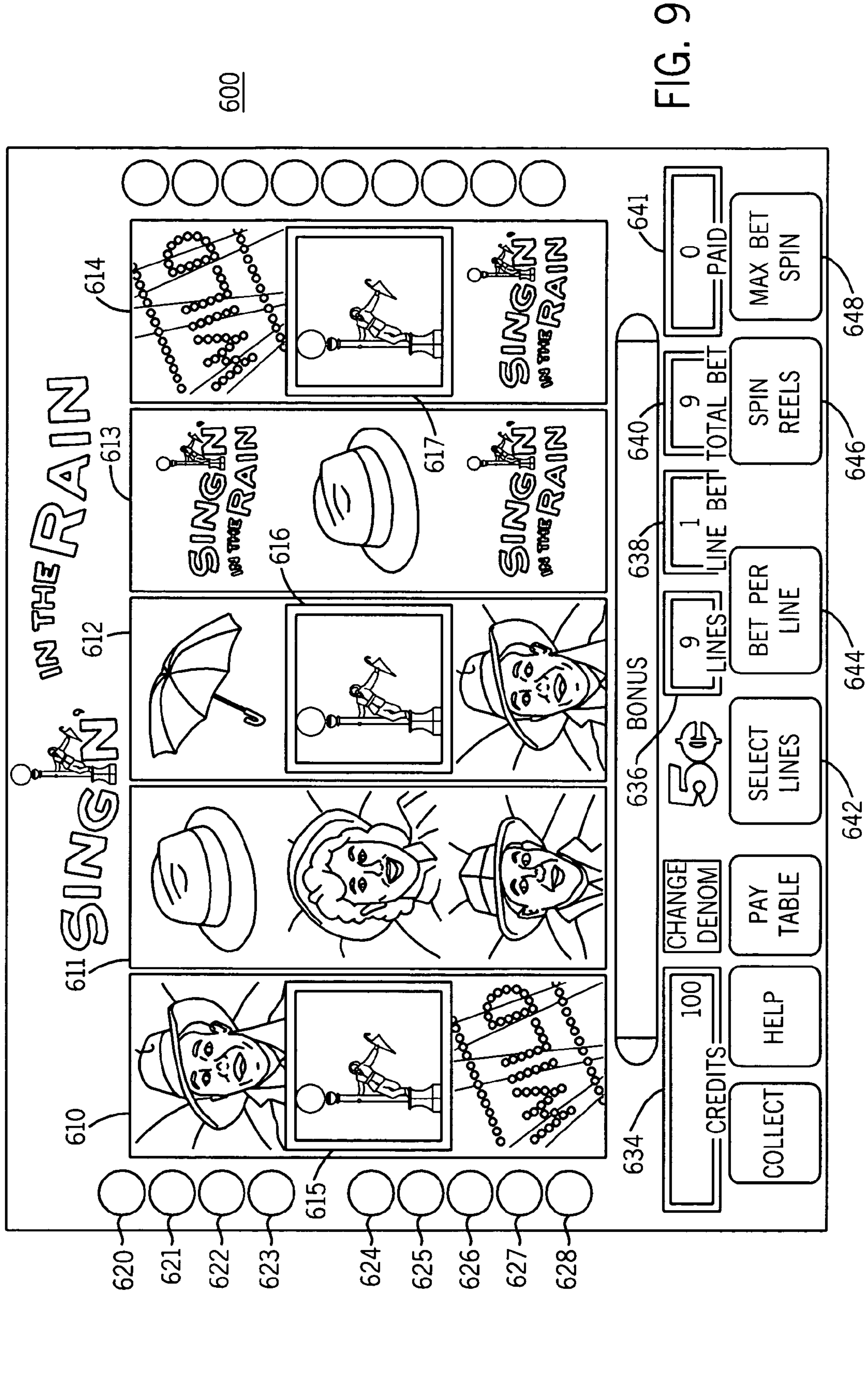
FIGS. 9-19 are a series of exemplary display screens that may be displayed during performance of the simultaneous multiple award feature routine of FIG. 4.

For example, FIG. 9 is an embodiment of an exemplary display screen 600 of a game outcome including an occurrence of a simultaneous multiple award feature triggering event that may be displayed on the main display device 31. The exemplary display screen 600 includes five video simulated reels 610-614 with nine pay lines 620-628. As will be appreciated by those of ordinary skill in the art, different numbers video simulated reels and/or pay lines may be included. Each of the pay lines 620-628 extends through one symbol on each of the five reels 610-614. In the illustrated example, an occurrence of three lamppost symbols 615, 616, 617 displayed on alternate reels 610, 612 and 614 respectively, triggers the simultaneous multiple award feature routine 500.

The exemplary display screen 600 also includes a credit meter 634 for displaying a number of credits available for base game play (e.g., 100 credits), a pay line indicator 636 for displaying the number of pay lines selected (e.g., 9 pay lines), a bet indicator 638 for displaying the number of credits wagered per pay line for a current game (e.g., 1 credit), a total bet indicator 640 for displaying the total credits wagered (e.g., 9 credits), and a paid indicator 641 for displaying credits won, if applicable, for the wager. Also shown are a number of player selectable buttons such as a select lines button 642, a bet per line button 644, a spin reels button 646, a max bet spin button 648, etc.

Referring again to FIG. 4, upon the occurrence of a simultaneous multiple award feature triggering event (step 402), the controller 200 enables play of the simultaneous award triggering feature routine 400 (step 406); in the illustrated example, displays an assemblage of selectable tiles that conceal an associated number of icons. The concealed icons include a number of unrelated game-theme icons and at least one group of related game-theme icons. The concealed icons also include at least one wild icon. A legend, much like a pay table, is also displayed adjacent to the assemblage of selectable tiles and includes a number of related game-theme icon matches and their associated awards. The groups of related game-theme icons are preferably like game-theme icons however they may also be any related game-theme icons such as a first portion and a second portion of an object (e.g., a top portion of a lamppost and a bottom portion of a lamppost). The awards are preferably varying numbers of free spins however other awards such as credits are contemplated.

In response to a displayed instruction, a player successively selects the tiles with a goal of matching related game-theme icons displayed on the legend. In response to detecting the successive player selections, the controller 200 reveals the icons associated with the selected tiles. A group of three related game-theme icons or a group of two related game-theme icons plus a wild icon are preferably required for an award. Therefore, in a preferred embodiment, if three related game-theme icons are revealed (e.g., three identical game-theme symbols) or if two related game-theme icons and a wild icon are revealed, the player is awarded an associated number of free spins displayed in the legend. Similarly, if two or more different groups of related game-theme pairs are revealed (step 408 and step 410), selection of a tile associated with a wild icon (step 412) results in matches for all of the groups of different related game-theme pairs. Thus, multiple simultaneous awards of free spins are possible if two or more different related game-theme pairs followed by a wild icon are revealed (step 414 and step 416).

Figure 10:
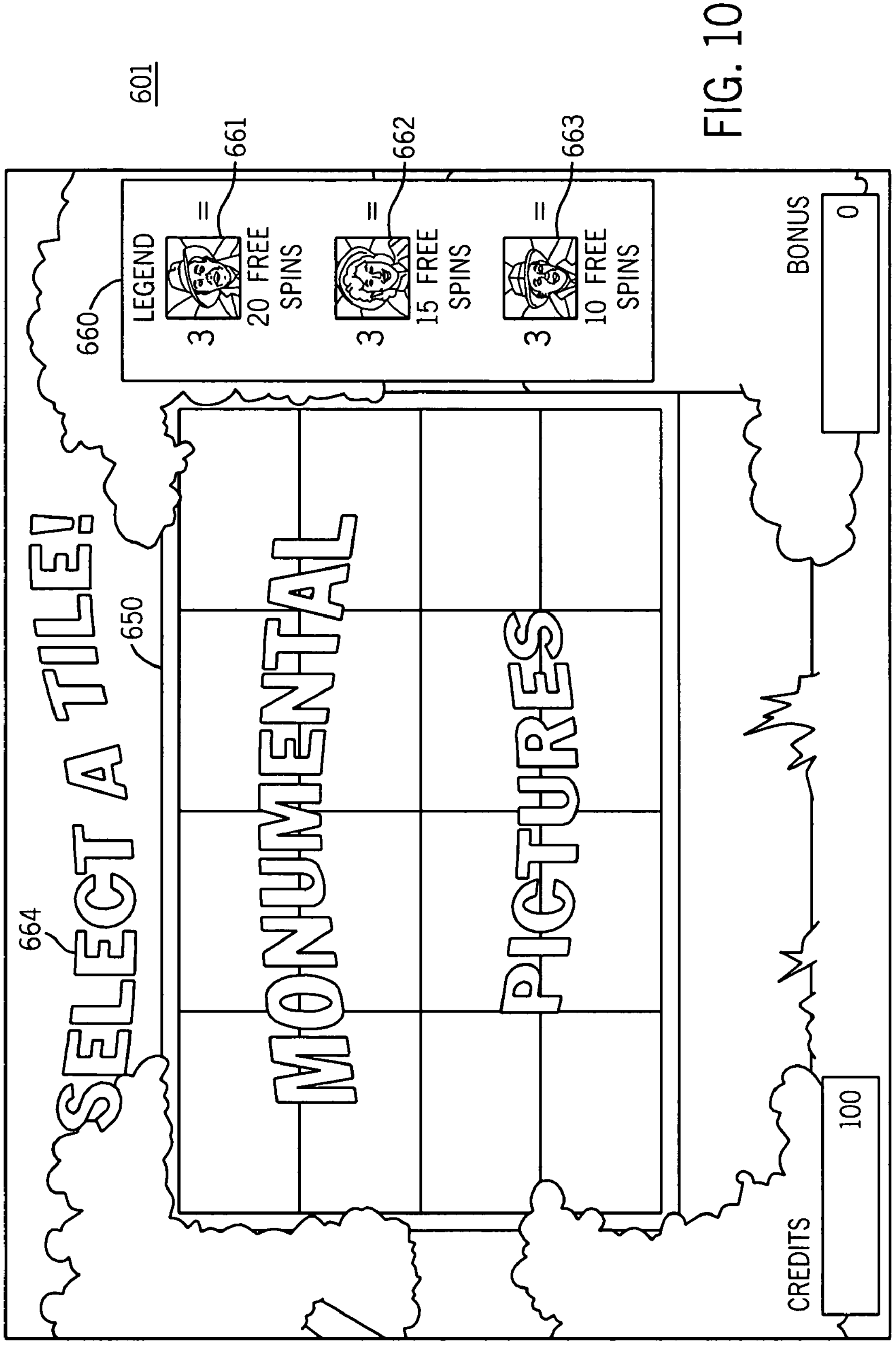

For example, FIG. 10 is an exemplary display screen 601 that may be displayed after an occurrence of the simultaneous multiple award feature triggering event of FIG. 9. The area occupied by reels 610-614 has been replaced by a theme display that includes the assemblage 650 of selectable tiles concealing a number of icons, and a legend 660; in this case, includes an assemblage of four rows and four columns yielding sixteen tiles, and a legend displaying three matches 661, 662, 663, and their associated awards of 20, 15 and 10 free spins respectively. Also displayed is an instruction 654 prompting the player to select tiles to reveal icons and possible matches formed by groups of related game-theme icons in the legend 660.

Successive player selections of the tiles of the assemblage 650, referred to herein as a player selection stage of the simultaneous multiple award feature, causes the controller 200 to reveal associated icons until one or more match(s) is/are made or until all tiles have been selected and their associated icons revealed. Therefore, unlike some prior art concealed image bonus feature schemes, there are no "pooper" tiles included in the assemblage 650 that, when selected, end the player selection process.

Figure 11:
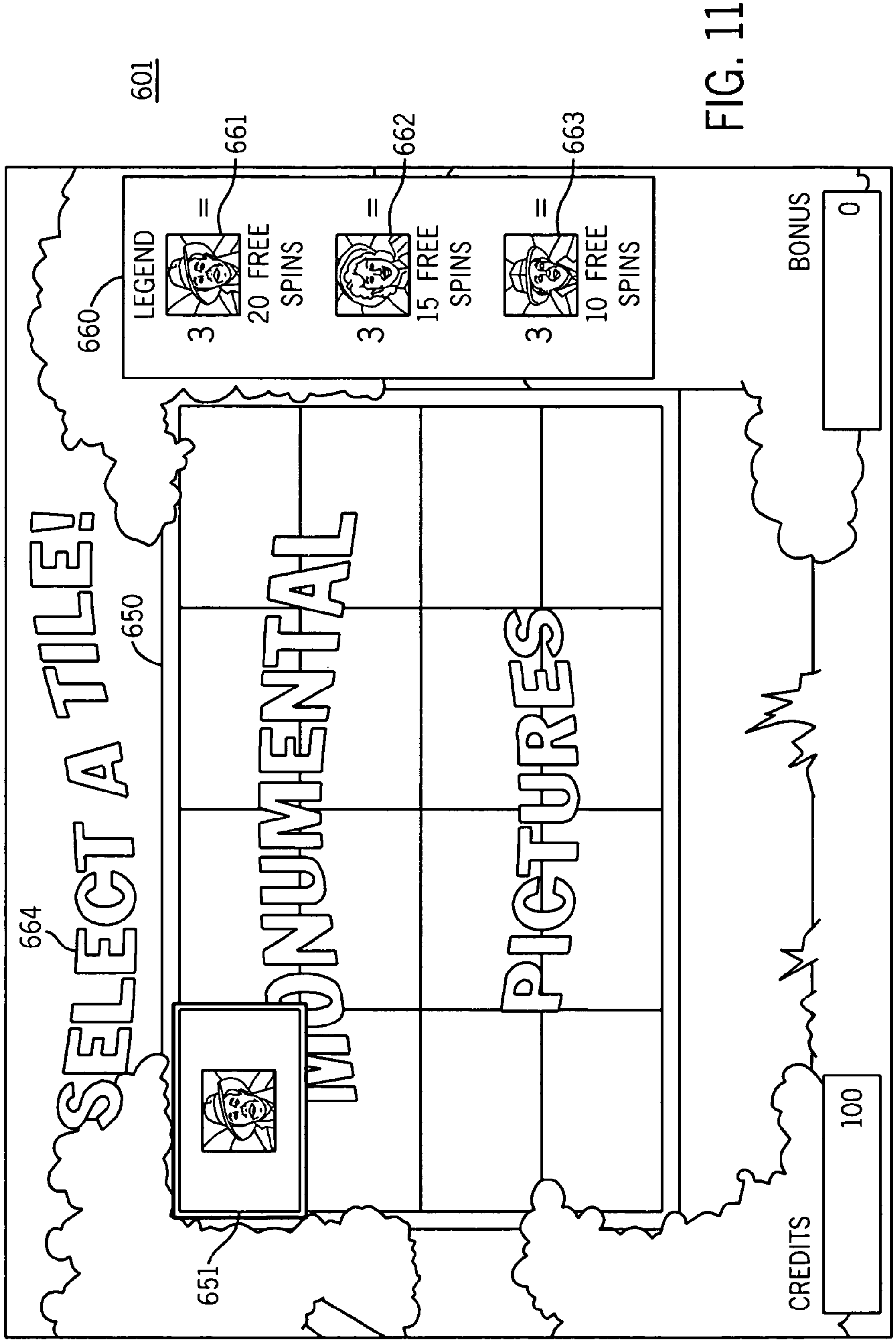
Figure 12:
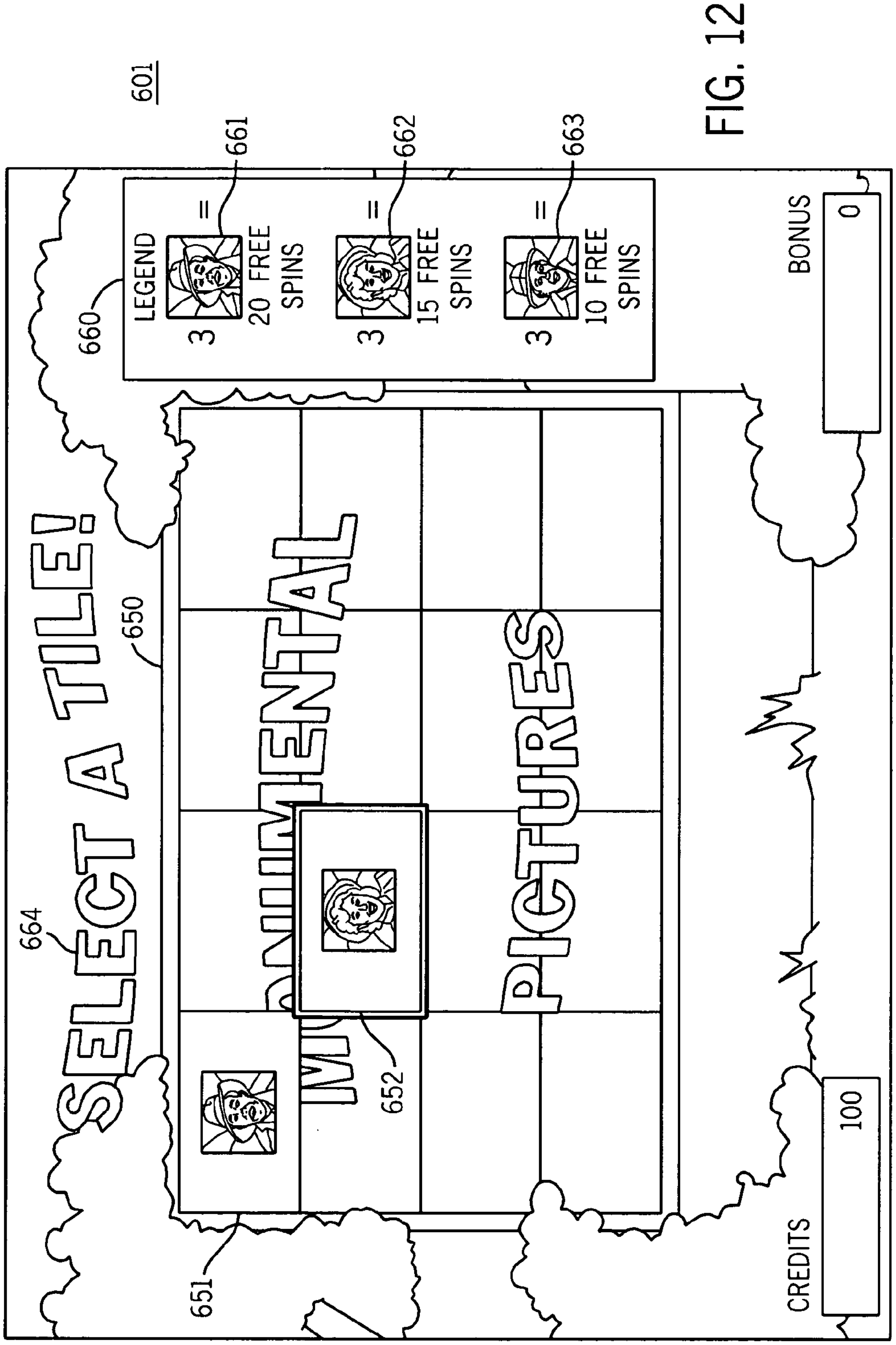
Figure 13:
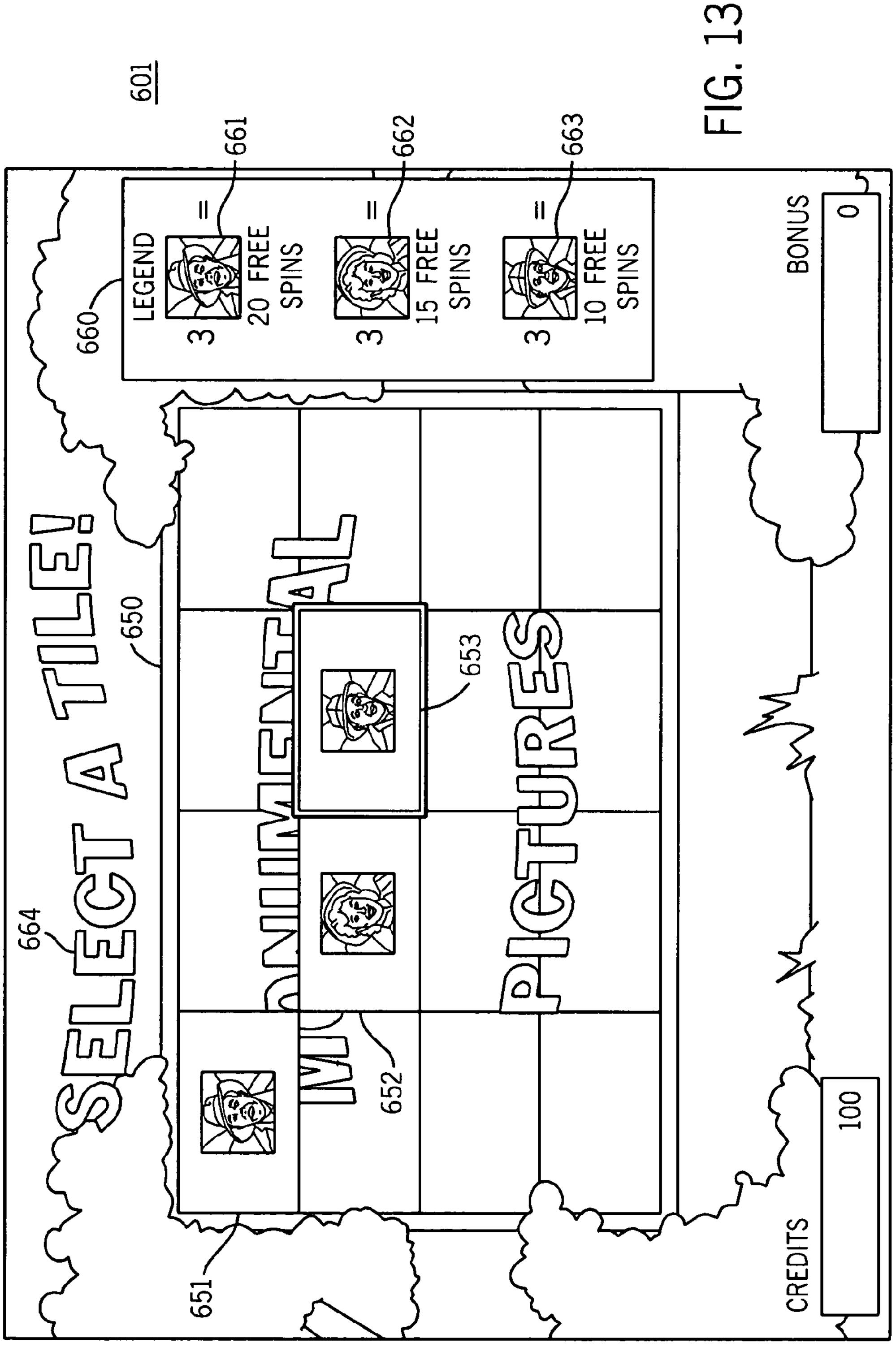
Figure 14:
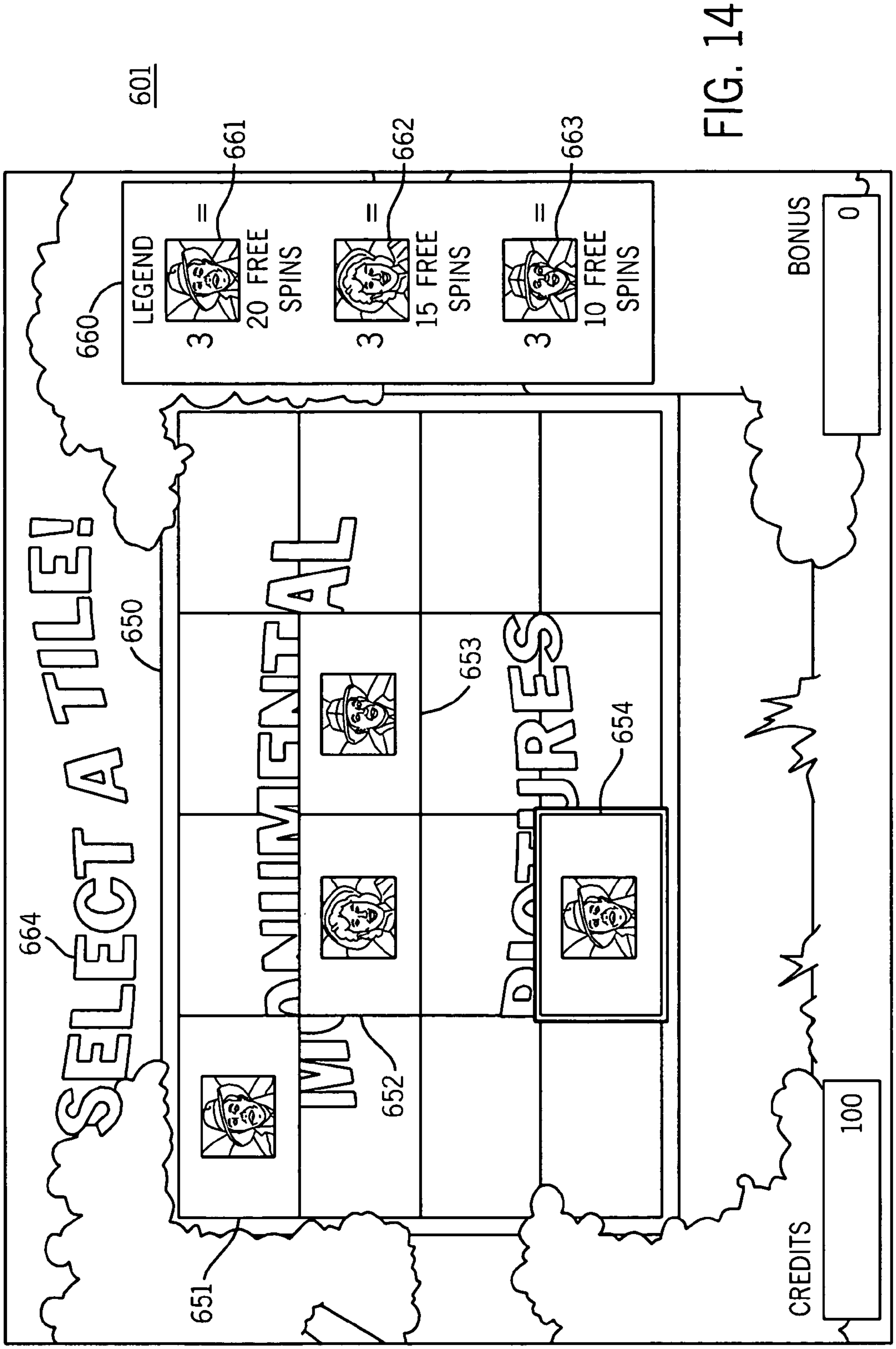

For example, referring to FIG. 11, upon detection of a player selection of a first tile 651, the controller 200 reveals a game-theme icon of "Gene". Similarly, upon detection of a player selection of a second tile 652, the controller reveals a game-theme icon of "Debbie" (see, FIG. 12); upon detection of a player selection of a third tile 653, the controller 200 reveals a game-theme icon of Donald (see, FIG. 13); and upon detection of a player selection of a fourth tile 654, the controller 200 reveals a second game-theme icon of Gene (see, FIG. 14). Thus, a first group (e.g., first pair) of related game-theme icons (i.e., identical Gene icons) has been revealed. Therefore, according to the legend 660, if a one more Gene icon is revealed next (i.e., upon detection of a player selection of a fifth tile), 20 free spins will be awarded to the player. Alternatively, if a wild icon is revealed next, the first group of related game-theme pairs will be matched. If an icon other than a Gene icon or a wild icon is revealed, player selection of the tiles will continue.

Figure 15:
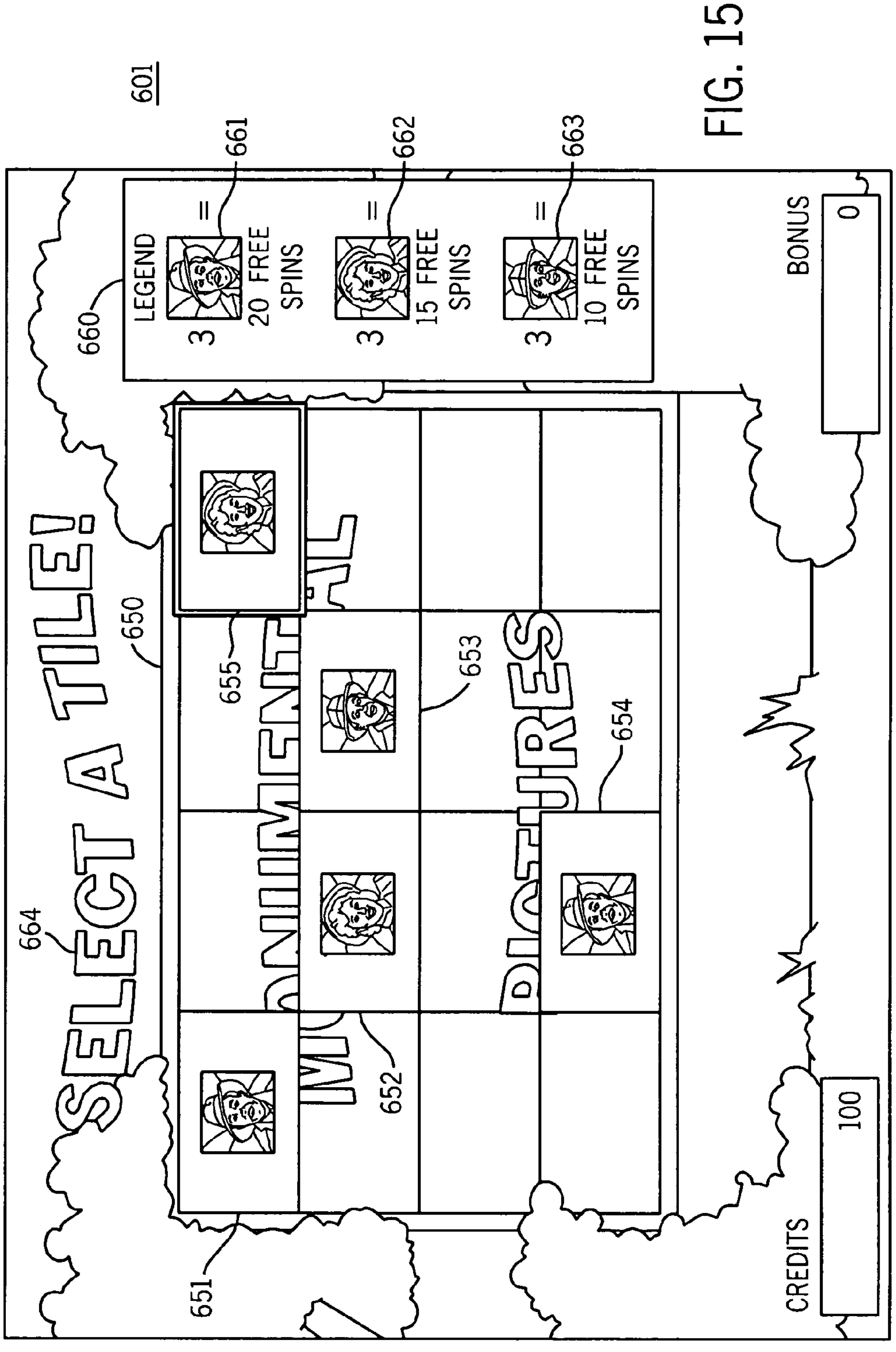
Figure 16:
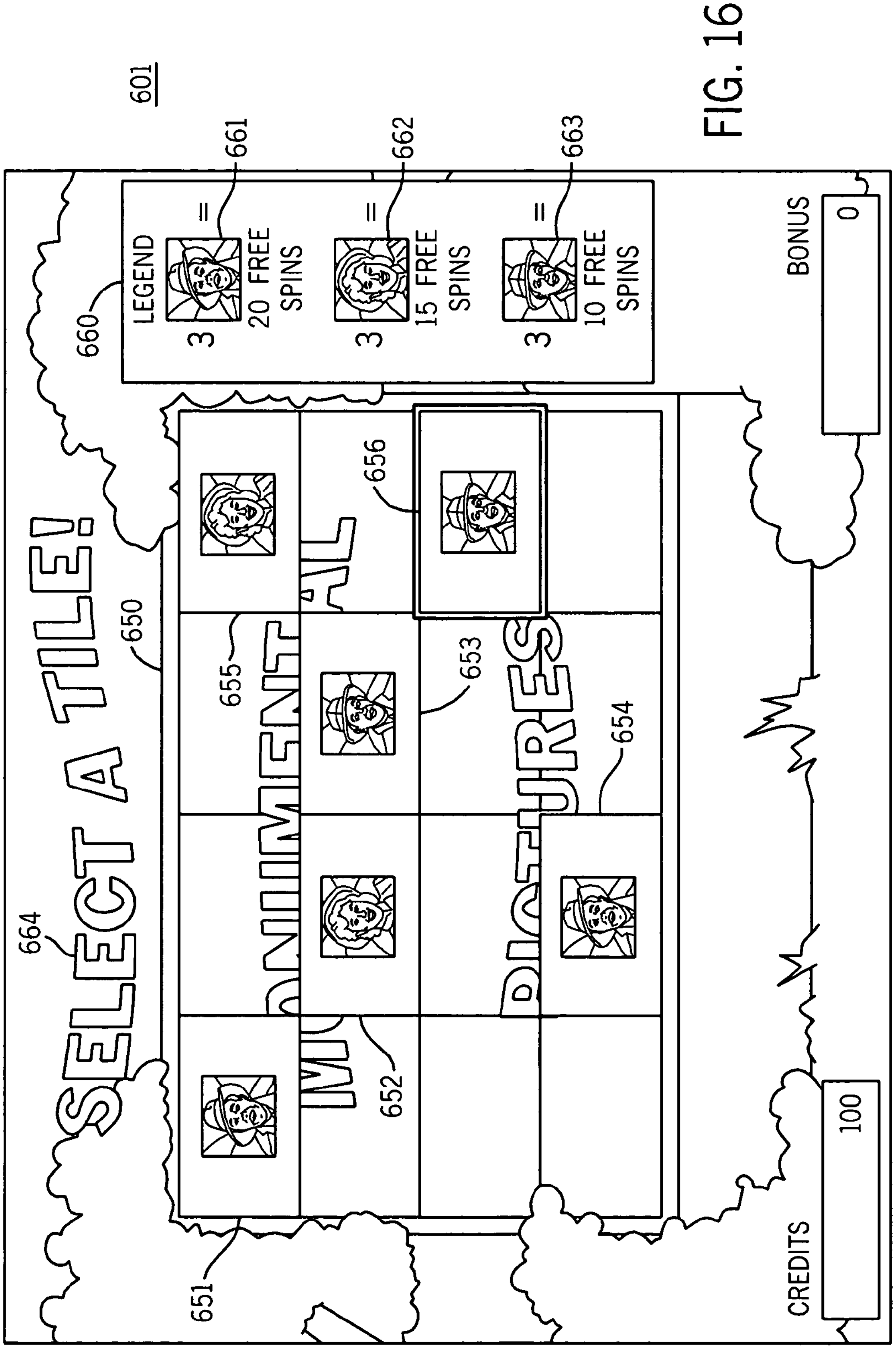
Figure 17:
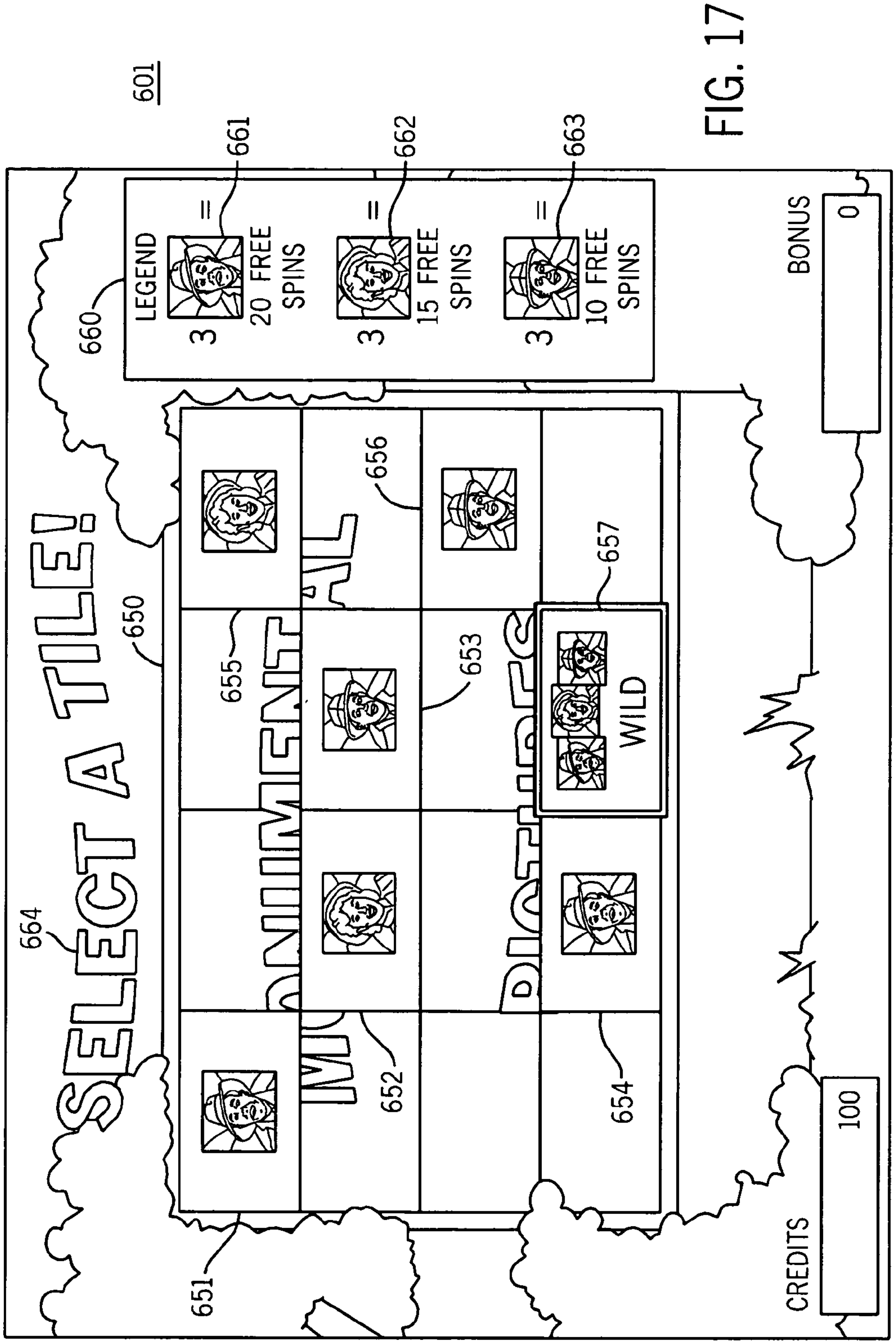

Continuing with the example and referring to FIG. 15, upon detection of a player selection of a fifth tile 655, the controller 200 reveals a second game-theme icon of Debbie. Similarly, upon detection of a player selection of a sixth tile 656, the controller 200 reveals a second game-theme icon of Donald (see, FIG. 16). Thus, a first group of related game-theme icons (i.e., a pair of identical Gene icons) has been revealed, a second group of related game-theme icons (i.e., a pair of identical Debbie icons) has been revealed, and a third group of related game-theme icons (i.e., a pair of identical Donald icons) has been revealed. Therefore, according to the legend 660, if a third Gene icon is revealed next (i.e., upon detection of a player selection of a seventh tile), 20 free spins will be awarded to the player. Similarly, if a third Debbie icon is revealed next, 15 free spins will be awarded and if a third Donald icon is revealed next 10 free spins will be awarded to the player. Alternatively, if a wild icon is revealed next, each of the first, second and third related game-theme groups will be matched and the player will be awarded 45 spins.

Figure 18:
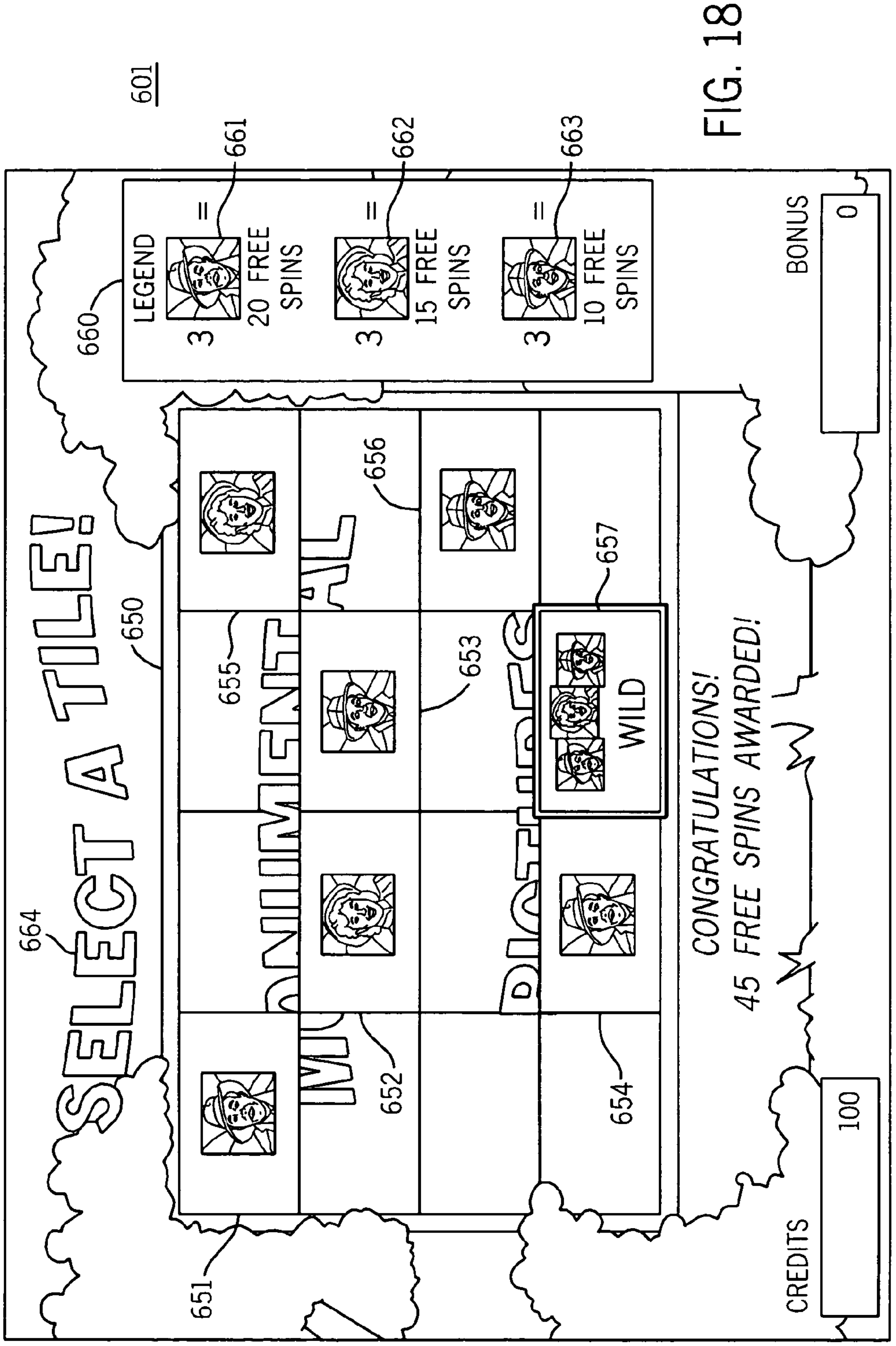

In the illustrated example of FIG. 18, in response to player selection of a seventh tile, the controller 200 reveals a wild icon and therefore, 45 free spins (i.e., 10 free spins plus 15 free spins plus 20 free spins) are awarded to the player. Upon the award of free spins, the player selection stage ends and a bonus stage of the simultaneous multiple award feature begins. The controller 200 then causes the reels 610-614 to be again displayed.

Figure 19:
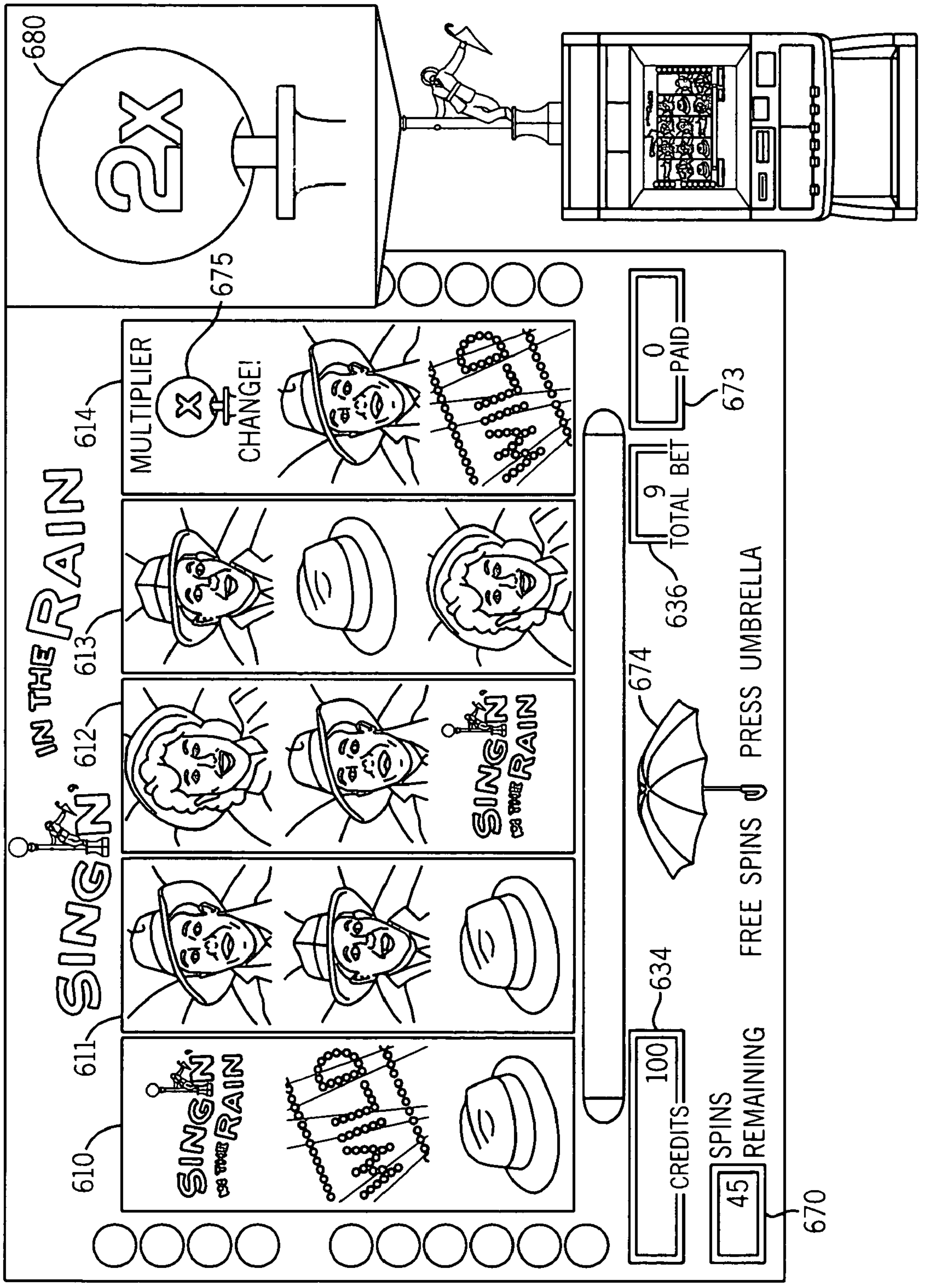

For example, FIG. 19 is an exemplary display screen 602 that may be displayed after an award of free spins as shown in FIG. 18. As is shown, the reels 610-614 are displayed as before however a multiplier symbol 675 has been added to the reels 614 for the bonus stage. Also shown on the exemplary display screen 602 are a spins remaining meter 670 and a credits paid meter 673.

Execution of the free spins may be automatically initiated by the controller 200 or may be initiated by the controller 200 upon player selection of a button, for example, upon player selection of a "FREE SPINS PRESS UMBRELLAS" button 674. With each free spin, the spins remaining meter 670 is decremented by one and any credits resulting from a winning outcome are added to the credits paid meter 673. When the multiplier symbol 675 appears in the symbol array of the stopped reels, a possible winning outcome is multiplied by a randomly selected multiplier number displayed in a multiplier legend 680. In the illustrated example, a "2×" in the multiplier legend 680 indicates that credits resulting from a winning outcome(s) are multiplied by two.

Although FIGS. 10-19 illustrate an embodiment of the multiple simultaneous award feature routine that includes a win of three awards, simultaneously awarded upon revealing a wild icon after revealing 3 different groups of related game-theme pairs (i.e., Gene, Debbie and Donald), it should be understood that other numbers of awards may be awarded to the player depending on the icons revealed and the order in which they are revealed. It should also be understood, that although player selection of tiles is terminated upon receiving one award or upon receiving multiple simultaneous awards (as described above), other termination scenarios are contemplated.

As may be apparent from the discussion above, the gaming machine having the shuffle feature routine 300 provides a player with an opportunity to positively affect an award outcome via a strategic selection of one of a number of different value-based symbols prior to rearranging the value-based to yield an award. The gaming machine having the simultaneous multiple award feature routine 400 provides a player with an ability to win simultaneous multiple awards when simultaneous matches of game-theme icons are enabled via subsequent selection of a wild icon.

From the foregoing, it will be observed that numerous variations and modifications may be affected without departing from the scope of the novel concept of the invention. It is to be understood that no limitations with respect to the specific methods and apparatus illustrated herein is intended or should be inferred. It is, of course, intended to cover by the appended claims all such modifications as fall within the scope of the claims.

It is claimed:

1. A method of conducting a wagering game on a gaming machine controlled by at least one processor in response to a wager, the method comprising:

displaying on a display device of the gaming machine, an assemblage of selectable tiles that conceal an associated plurality of icons, the plurality of icons including a plurality of game-theme icons and a wild icon;

receiving successive selections of the tiles;

selectively revealing, by the at least one processor, a first group of related game-theme icons associated with the selected tiles, the first group including at least two first tiles from the assemblage of selectable tiles, each of the first tiles having a first game-theme icon, the first game-theme icon from one of the first tiles matching the first game-theme icon from another one of the first tiles;

selectively revealing, by the at least one processor, a second group of related game-theme icons associated with the selected tiles, the second group being different from the first group, the second group including at least two second tiles from the assemblage of selectable tiles, each of the second tiles having a second game-theme icon, the second game-theme icon from one of the second tiles matching the second game-theme icon from another one of the second two tiles, the second game-theme icon being different than the first game-theme icon;

selectively revealing, by the at least one processor, the wild icon associated with the selected tiles after revealing the first group and the second group; and in response to revealing the wild icon, simultaneously awarding, by the at least one processor, a first award and a second award, the first award being based on the at least two first tiles of the first group, the second award being based on the at least two second tiles of the second group.

2. The method of claim 1, further including displaying a legend adjacent to the assemblage of selectable tiles, the legend displaying a plurality of matches and respective awards, each of the plurality of matches including a plurality of related game-theme icons.

3. The method of claim 1, further including displaying a base wagering game including a plurality of possible randomly-selected outcomes, at least one of the possible outcomes being a bonus game triggering event causing the assemblage of selectable tiles to be displayed.

4. The method of claim 3, wherein the base wagering game includes a plurality of symbol-bearing reels that are rotated and stopped to place symbols on the reels in a reel symbol array, and wherein the bonus game triggering event includes a predetermined arrangement of selected symbols on the stopped reels.

5. The method of claim 4, wherein the first award comprises a first number of free reel spins, and wherein the second award comprises a second number of free reel spins.

6. The method of claim 5, further comprising multiplying a credit amount associated with a winning outcome of at least one of the first number of free reel spins by a first randomly generated number, and multiplying a credit amount associated with a winning outcome of at least one of the second number of free spins by a second randomly generated number.

7. The method of claim 1, wherein the gaming machine comprises a video slot machine, and wherein displaying the assemblage of selectable tiles includes displaying a video generated assemblage of selectable tiles.

8. The method of claim 1, wherein the gaming machine comprises an adaptable mechanical spinning reel slot machine including a plurality of electro-mechanical reels having a plurality of reels symbols displayed thereon, and wherein displaying the assemblage of selectable tiles includes displaying a video generated assemblage of selectable tiles provided by a flat panel transmissive display configured to overlay the assemblage of selectable tiles upon a portion of the plurality of electro-mechanical reels.

9. The method of claim 1, wherein the first award comprises a first credit amount, and wherein the second award comprises a second credit amount.

10. A gaming machine controlled by at least one processor in response to a wager, the gaming machine comprising:

a display device for displaying a simultaneous multiple award feature, the display device initially displaying an assemblage of selectable tiles that conceal a plurality of icons, the tiles being successively selected revealing a first group of related game-theme icons and revealing a second group of related game-theme icons and revealing a wild icon after revealing the first group and the second group, the first group including at least two first tiles from the assemblage of selectable tiles, each of the two first tiles having a first game-theme icon, the first game-theme icon from one of the first tiles matching the first game-theme icon from another one of the first tiles, the second group including at least two second tiles from the assemblage of selectable tiles, each of the second tiles having a second game-theme icon, the second game-theme icon from one of the second tiles matching the second game-theme icon from another one of the second two tiles, the at least two first tiles of the first group being mutually exclusive of the at least two second tiles of the second group;

the at least one processor being coupled to the display device and operative to simultaneously award, in response to revealing the wild icon, a first award based upon the first group and a second award based upon the second group, the first award being based on the at least two first tiles of the first group, the second award being based on the at least two second tiles of the second group.

11. The gaming machine of claim 10, wherein the display device comprises a video display.

12. The gaming machine of claim 10, further comprising a base wagering game including a plurality of possible base wagering game outcomes, at least one of the plurality of possible base wagering game outcomes being an event triggering the assemblage of selectable tiles to be displayed.

13. The gaming machine of claim 12, wherein the gaming machine comprises a slot machine having a plurality of symbol-bearing reels that are rotated and stopped to place symbols on the reels in a symbol array, and wherein the event includes a predetermined arrangement of selected symbols on the stopped reels.

14. The gaming machine of claim 13, wherein the plurality of symbol-bearing reels comprises a plurality of electro-mechanical symbol-bearing reels, and wherein the display device comprises a flat panel transmissive display configured to overlay the assemblage of selectable tiles upon a portion of the plurality of electro-mechanical symbol-bearing reels.

15. The gaming machine of claim 13, wherein the first award comprises a first number of free reel spins, and wherein the second award comprises a second number of free reel spins.

16. The gaming machine of claim 15, further comprising multiplying a credit amount associated with a winning outcome of at least one of the first number of free reel spins and at least one of the second number of free spins by a randomly generated number.

17. The gaming machine of claim 10, wherein the assemblage of selectable tiles is arranged as a matrix having multiple rows and columns.

18. A method having a simultaneous multiple award feature for a gaming machine controlled by at least one processor, the method comprising:

displaying on a display device of the gaming machine the simultaneous multiple award feature, the simultaneous multiple award feature having a player selection stage and a bonus stage, the player selection stage including an assemblage of selectable tiles that conceal a plurality of icons;

selectively selecting the tiles to reveal respective icons until a tile revealing a wild icon is selected that produces a multiple award outcome, the player selection stage including selectively selecting a first group of tiles and a second group of tiles, the first group including at least two first tiles from the assemblage of selectable tiles, each of the first tiles having a first game-theme icon, the first game-theme icon from one of the first tiles matching the first game-theme icon from another one of the first tiles, the second group including at least two second tiles from the assemblage of selectable tiles, each of the second tiles having a second game-theme icon, the second game-theme icon being different than the first game-theme icon, the second game-theme icon from one of the second tiles matching the second game-theme icon from another one of the second two tiles;

in response to revealing the wild icon, simultaneously awarding by the at least one processor the multiple award outcome including a first award and a second award, the first award being based on the at least two first tiles of the first group, the second award being based on the at least two second tiles of the second group; and triggering the bonus stage in response to the multiple award outcome, each award of the multiple award outcome generated in the player selection stage earning the player an opportunity to win a respective bonus in the bonus stage.

19. The method of claim 18, wherein each award is associated with a predetermined number of free spins of reels of a slot gaming machine.

20. The method of claim 19, further comprising multiplying a credit amount associated with a winning outcome of at least one of the predetermined number of free spins by a randomly generated number.

21. The method of claim 18, wherein the display device comprises a video display.

* * * * *